United States Patent [19]
Hall, Jr. et al.

[11] Patent Number: 6,094,484
[45] Date of Patent: Jul. 25, 2000

[54] ISOMORPHIC PATTERN RECOGNITION

[75] Inventors: Floyd Steven Hall, Jr.; Cameron Telfer Howie, both of Menlo Park, Calif.

[73] Assignee: Convey Corporation, Menlo Park, Calif.

[21] Appl. No.: 08/950,287

[22] Filed: Oct. 14, 1997

Related U.S. Application Data

[60] Provisional application No. 60/028,649, Oct. 16, 1996, provisional application No. 60/028,578, Oct. 16, 1996, and provisional application No. 60/028,575, Oct. 16, 1996.

[51] Int. Cl.$^7$ .................................................. H04L 9/00
[52] U.S. Cl. .............................. 380/28; 380/51; 382/181
[58] Field of Search .............................. 380/1, 51, 28; 382/177, 181, 185–187, 198, 200, 203, 204, 206, 209, 216, 217, 228–231

[56] References Cited

U.S. PATENT DOCUMENTS

| | | | |
|---|---|---|---|
| 4,610,025 | 9/1986 | Blum et al. ................................... | 380/1 |
| 5,384,863 | 1/1995 | Huttenlocher et al. ...................... | 382/9 |
| 5,410,611 | 4/1995 | Huttenlocher et al. ...................... | 382/9 |
| 5,455,871 | 10/1995 | Bloomberg et al. ..................... | 382/173 |
| 5,539,841 | 7/1996 | Huttenlocher et al. .................. | 382/218 |
| 5,557,689 | 9/1996 | Huttenlocher et al. .................. | 382/177 |
| 5,642,435 | 6/1997 | Loris ........................................ | 382/229 |
| 5,689,620 | 11/1997 | Kopec et al. .............................. | 395/20 |
| 5,825,923 | 10/1998 | Thompson et al. ...................... | 382/204 |

OTHER PUBLICATIONS

Barker, Wayne G., "Cryptanalysis of the Simple Substitution Cipher with Word Divisions—Using Non–Pattern Word Lists", Aegean Park Press, Apr. 1996, pp. 15–20.

*Primary Examiner*—Salvatore Cangialosi

[57] ABSTRACT

The present invention is a system and method for character recognition using pattern recognition. In one embodiment of the invention, a plurality of representations of a plurality of characters is received by a system. A plurality of cipher labels are assigned to representations in the plurality of representations. The plaintext identity of cipher labels in the plurality of cipher labels is determined using isomorphic pattern recognition. The present invention includes A plaintext isomorphic dictionary containing plaintext words organized by their root isomorphic patterns. Additionally, the present invention includes a Raster-Plaintext Library which contains extensive data on taster letters, and their plaintext identities, from an exhaustive collection of fonts.

41 Claims, 32 Drawing Sheets

Multi-Language Ciphertext Document
(English and German)

FKVNRZYKXQLY IXWV IVV

English and German Plaintext Isomorphic Dictionary
(Relevant Excerpts Only)

| Group #1 |
|---|
| A B C D E F G B H I J G |
| b r e a k t h r o u g h |
| c o m p u l s o r i e s |

| Group #2 |
|---|
| A B C D E B F G B G |
| b e f r i e n d e d |
| g e a r b e i t e t |
| p i t y r i a s i s |

| Group #3 |
|---|
| A B C D E F |
| b e y o n d |
| p r o v e n |
| t h i n g s |
| t h o n g s |

| Group #4 |
|---|
| A B C D E |
| c o u l d |
| h a r u n |
| n i g h t |
| n i g h t |
| s o u n d |
| t o u c h |
| w a r u m |

| Group #5 |
|---|
| A B C D |
| b o l d |
| j o h n |
| l a w n |
| m a r y |
| t h e y |

| Group #6 |
|---|
| A B C |
| a s k |
| w h o |
| w h y |

| Group #7 |
|---|
| A B |
| g o |
| h e |
| t o |
| w e |

FIGURE 5

Mappings

| Cipher Label | A | B | C | D | E | F | G | H | I | J | K | L | M | N | P | Q | R | S | V | W | X | Y | Z |
|---|---|---|---|---|---|---|---|---|---|---|---|---|---|---|---|---|---|---|---|---|---|---|---|
| Plaintext Letter | | | | | | | | | | | | | | | | | | | | | | | |

Document Word List

NI   IVV   IXWV   PXQGJ   ZYSALI   LVIZVKA   LVNKFVSZVZ   FKVNRZYKXQLY
FV   NKV   ZYVH   MNKQW
MV   NAJ   YNIZ   ASPYZ
JQ   NIR
     MYH
     AXZ

← Trial Word #I(1)        ← Selected Word #I

FIGURE 6

|                               | Selected Word #I            | Trial Word #I(1)      |
|-------------------------------|-----------------------------|-----------------------|
| Original pattern              | F K V N R Z Y K X Q L Y     | L V N K F V S Z V Z   |
| Inherited Isomorphic Pattern  | A B C D E F G B H I J G     | J C D B A C K F C F   |
| Candidate plaintext word #1   | b r e a k t h r o u g h     | g e a r b e K t e t   |
| Candidate plaintext word #2   | c o m p u l s o r i e s     | e m p o c m K l m l   |

FIGURE 7

| | Selected Word #II | Trial Word #II(1) |
|---|---|---|
| Original pattern | t h S A g I | g e a r b e s t e t |
| Inherited Isomorphic Pattern | t h A B g C | g e a r b e A t e t |
| Candidate plaintext word #1 | t h i n g s | g e a r b e i t e t |
| Candidate plaintext word #2 | t h o n g s | g e a r b e o t e t |

FIGURE 9

Mappings

| Cipher Label | A | B | C | D | E | F | G | H | I | J | K | L | M | N | P | Q | R | S | V | W | X | Y | Z |
|---|---|---|---|---|---|---|---|---|---|---|---|---|---|---|---|---|---|---|---|---|---|---|---|
| Plaintext Letter | n | | | | b | | | s | | r | | g | | a | | u | k | i | e | | o | h | t |

Document Word List as    see    soWe    PouGJ    things    gestern    gearbeitet    breakthrough
be    are    theH    MaruW
Me    anJ    hast    niPht
Ju    alk
     MhH
     not PouGJ → Selected Word #III niPht ← Trial Word #III(1)

FIGURE 10

| | Selected Word #III | Trial Word #III(1) |
|---|---|---|
| Original pattern | P o u G J | n i P h t |
| Inherited Isomorphic Pattern | A o u B C | n i A h t |
| Candidate plaintext word #1 | c o u l d | n i c h t |
| Candidate plaintext word #2 | s o u n d | n i s h t |
| Candidate plaintext word #3 | t o u c h | n i t h t |

FIGURE 11

|  | Selected Word #IV | Trial Word #IV(1) | Trial Word #IV(1) |
|---|---|---|---|
| Original pattern | M a r u W | M e | M h H |
| Inherited Isomorphic Pattern | A a r u B | A e | A h H |
| Candidate plaintext word #1 | h a r u n | h e | h h H |
| Candidate plaintext word #2 | w a r u n | w e | w h H |

FIGURE 13

|  | Selected Word #V | Trial Word #V(1) |
|---|---|---|
| Original pattern | w h H | t h e H |
| Inherited Isomorphic Pattern | w h A | t h e A |
| Candidate plaintext word #1 | w h o | t h e o |
| Candidate plaintext word #2 | w h y | t h e y |

FIGURE 15

Mappings

| Cipher Label | A | B | C | D | E | F | G | H | I | J | K | L | M | N | P | Q | R | S | V | W | X | Y | Z |
|---|---|---|---|---|---|---|---|---|---|---|---|---|---|---|---|---|---|---|---|---|---|---|---|
| Plaintext Letter | n |   |   |   |   | b | l | y | s | d | r | g | w | a | c | u | k | i | e | m | o | h | t |

Document Word List as    see    some    could    things    gestern    gearbeitet    breakthrough
be    are    they    warum
we    and    hast    nic

Multi-Language Ciphertext Document
(English and German)

FKVNRZYKXQLY IXWV IVV ZYSALI NI ZYVH NKV NAJ NIR MYH
MV IVV ZYSALI NI ZYVH PXQGJ FV NAJ NIR MYH AXZ
MNKQW YNIZ JQ LVIZVKA ASPYZ LVNKFVSZVZ

"English" Plaintext Solution breakthrough some see things as they are and ask why
we see things as they could be and ask why not "German" Plaintext Solution warum hast du gestern nicht gearbeitet

FIGURE 17

| Selected Word | 04 09 s i n 08 s s s |
|---|---|
| Candidate plaintext word (i = 1) | b u s i n e s s |
| Candidate plaintext word (i = 2) | c o s i n e s s |
| Candidate plaintext word (i = 3) | r o s i n e s s |

$\updownarrow \quad C_1 \quad C_2 \sin C_3 \; s \; s \; s$
$\updownarrow \quad P_{1,1} \; P_{1,2} \sin P_{1,3} \; s \; s \; s$
$\updownarrow \quad P_{2,1} \; P_{2,2} \sin P_{2,3} \; s \; s \; s$
$\updownarrow \quad P_{3,1} \; P_{3,2} \sin P_{3,3} \; s \; s \; s$ Hence, we have:

$N_{SW} = 3 \quad N_{candidates} = 3$ $C_1 = 04 \quad C_2 = 09 \quad C_3 = 08$
$P_{1,1} = b \quad P_{1,2} = u \quad P_{1,3} = e$
$P_{2,1} = c \quad P_{2,2} = o \quad P_{2,3} = e$
$P_{3,1} = r \quad P_{3,2} = o \quad P_{3,3} = e$

FIGURE 18A

If the Library Function $L(C_j, P_{i,j})$, for each candidate plaintext word 'i' yields the following results, $L(C_1, P_{1,1}) = L(04,b) = 1$       $L(C_2, P_{1,2}) = L(09,u) = 1$       $L(C_3, P_{1,3}) = L(08,e) = 1$ $L(C_1, P_{2,1}) = L(04,c) = 0$       $L(C_2, P_{2,2}) = L(09,o) = 0$       $L(C_3, P_{2,3}) = L(08,e) = 1$ $L(C_1, P_{3,1}) = L(04,r) = 0$       $L(C_2, P_{3,2}) = L(09,o) = 0$       $L(C_3, P_{3,3}) = L(08,e) = 1$ then the one surviving candidate plaintext word 'i=1' is assumed to be the correct plaintext substitute for the Selected Word under consideration. This establishes the following *mappings*:
04 → b, 09 → u, and 08 → e.

FIGURE 18B

Recreating and Searching Candidate Plaintext Words for Pattern Tags

The search engine will automatically recreate and search a list of candidate plaintext words, for the Pattern Tag under consideration, only when the following two criteria are satisfied:

1. the Root isomorphic pattern of the Pattern Tag is *identical* to the Root isomorphic pattern of the Input Search Word.

2. the plaintext letters in the Pattern Tag are identical to the plaintext letters in the Input Search Word.

In this example, cipher labels = uppercase letters and plaintext letters = lowercase letters.

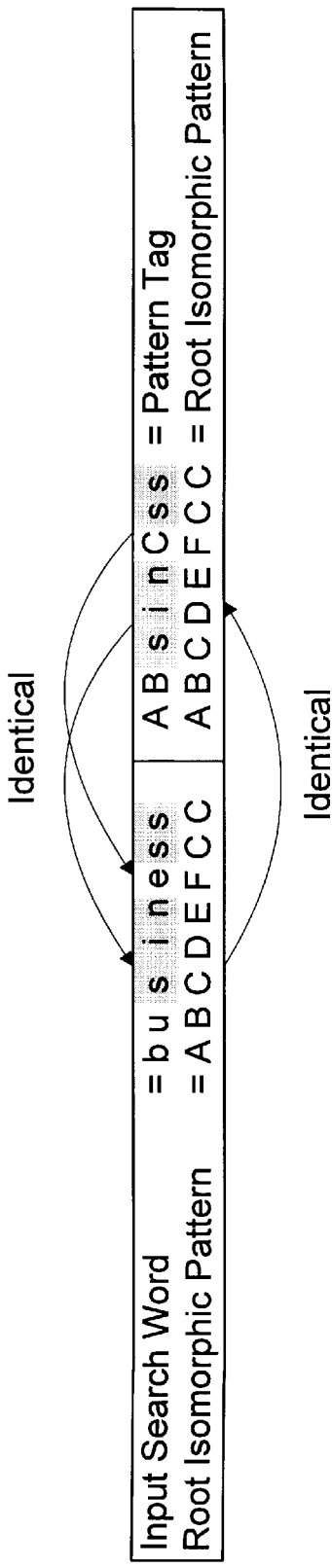

FIGURE 19A

Search Engine

Since criteria 1 and 2 are satisfied, the search engine automatically invokes the plaintext Isomorphic Dictionary and recreates the list of candidate plaintext words. As shown below, when this list is searched, the Input Search Word is indeed found. Hence, the search engine will present the pages containing this search word to the user:

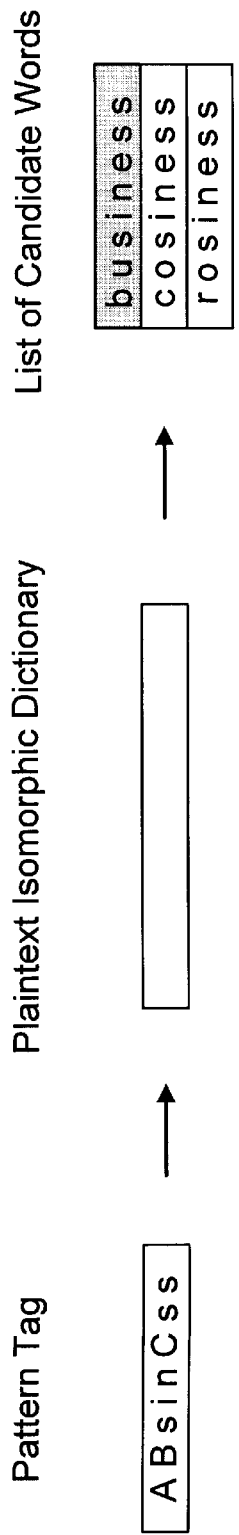

Pattern Tag → Plaintext Isomorphic Dictionary → List of Candidate Words

| blob #1 | blob#2 | Applying the XOR operator to these images returns the XOR image: |
|---|---|---|
| 11111 | 00100 | 11011 |
| 00100 | 00100 | 00000 |
| 00100 | 00100 | 00000 |
| 00100 | 00100 | 00000 |
| 11111 | 01110 | 10001 |

*Answer-Array*

| Disg. 1 | Freq. of 1 | Box 1 | PText 1 | font 1 | LCP | UCP | punct. | numbers | symbols |
|---|---|---|---|---|---|---|---|---|---|
| Disg. 2 | Freq. of 2 | Box 2 | PText 2 | font 1 | LCP | UCP | punct. | numbers | symbols |
| Disg. 3 | Freq. of 3 | Box 3 | PText 3 | font 1 | LCP | UCP | punct. | numbers | symbols |
| Disg. 4 | Freq. of 4 | Box 4 | PText 4 | font 1 | LCP | UCP | punct. | numbers | symbols |
| Disg. 5 | Freq. of 5 | Box 5 | PText 5 | font 2 | LCP | UCP | punct. | numbers | symbols |
| ...... | ...... | ...... | ...... | ...... | ...... | ...... | ...... | ...... | ...... |
| Disg. n | Freq. of n | Box n | PText n | font k | LCP | UCP | punct. | numbers | symbols | where: "Disg." = Disguise, "Freq." = Frequency, "PText" = Plaintext, "LCP" = Lowercase Possibilities, "UCP" = Uppercase Possibilities, "punct." = punctuation

FIGURE 25

*Answer-Array*

| Disg. 1 | Freq. of 1 | Box 1 | PText 1 | font 1 | LCP | UCP | punct. | numbers | symbols |
|---|---|---|---|---|---|---|---|---|---|
| Q | 1 | 5 | | 1 | a e h<br>i m | A E H<br>I M | | | |

FIGURE 26

| U4P-Array | | 4P-Array | |
|---|---|---|---|
| VCVV | ..... rearrange ....... | ISIS | ......... 2 pairs = 4 letters involved in repetitions |
| SVTV | | VCVV | ......... 3 identical letters = 3 letters involved in repetitions |
| ISIS | | SVTV | ......... 2 identical letters = 2 letters involved in repetitions |

FIGURE 27

TW-Array

| Selected - Word Isomorph | Trial - Word 1 Isomorph 1 | Trial - Word 2 Isomorph 2 | Trial - Word m Isomorph m |
|---|---|---|---|
| plaintext answer 1 | 2 | 0 | |
| plaintext answer 2 | 0 | | |
| plaintext answer 3 | 2 | 2 | plaintext TW3 |
| ..... | ..... | ..... | ..... |
| plaintext answer n | 2 | plaintext TW2 | 0 |

| A | n | t | B | m | B | d | a | t | B | o | n |
|---|---|---|---|---|---|---|---|---|---|---|---|
|   | n | t | B | m | B | d | a | t | B | o | n |
|   |   | t | B | m | B | d | a | t | B | o | n |
|   | B | n | t | B | m | B | d | a | t | B | o | n |
|   | m |   | B | m | B | d | a | t | B | o | n |
|   | d |   |   | B | m | B | d | a | t | B | o | n |
|   | a |   |   |   | B | m | B | d | a | t | B | o | n |
|   | o |   |   |   |   | B | m | B | d | a | t | B | o | n |

FIGURE 30

| A | n | t | A | m | A | d | a | t | A | o | n |
|---|---|---|---|---|---|---|---|---|---|---|---|
| A | n | t | A | m | A | d | a | t | t |   | o | n |
| A | n | t | A | m | A | d | a | t | m |   | o | n |
| A | n | t | A | m | A | d | a | t | d |   | o | n |
| A | n | t | A | m | A | d | a | t | a |   | o | n |
| A | n | t | A | m | A | d | a | t | B |   | o | n |
| A | n | t | A | m | A | d | a | t | o |   | o | n |

FIGURE 31

| Selected Word | Trial-Word #1 | Trial-Word #2 | Trial-Word #3 | Trial-Word #4 | Trial-Word #5 |
|---|---|---|---|---|---|
| DE | EDN | MaNE | lDJKe | PMDNK | ADCKB |
| A B | B A C | C a D B | l{C A D E e} | C D A E F | l{C A D E F} |

FIGURE 32

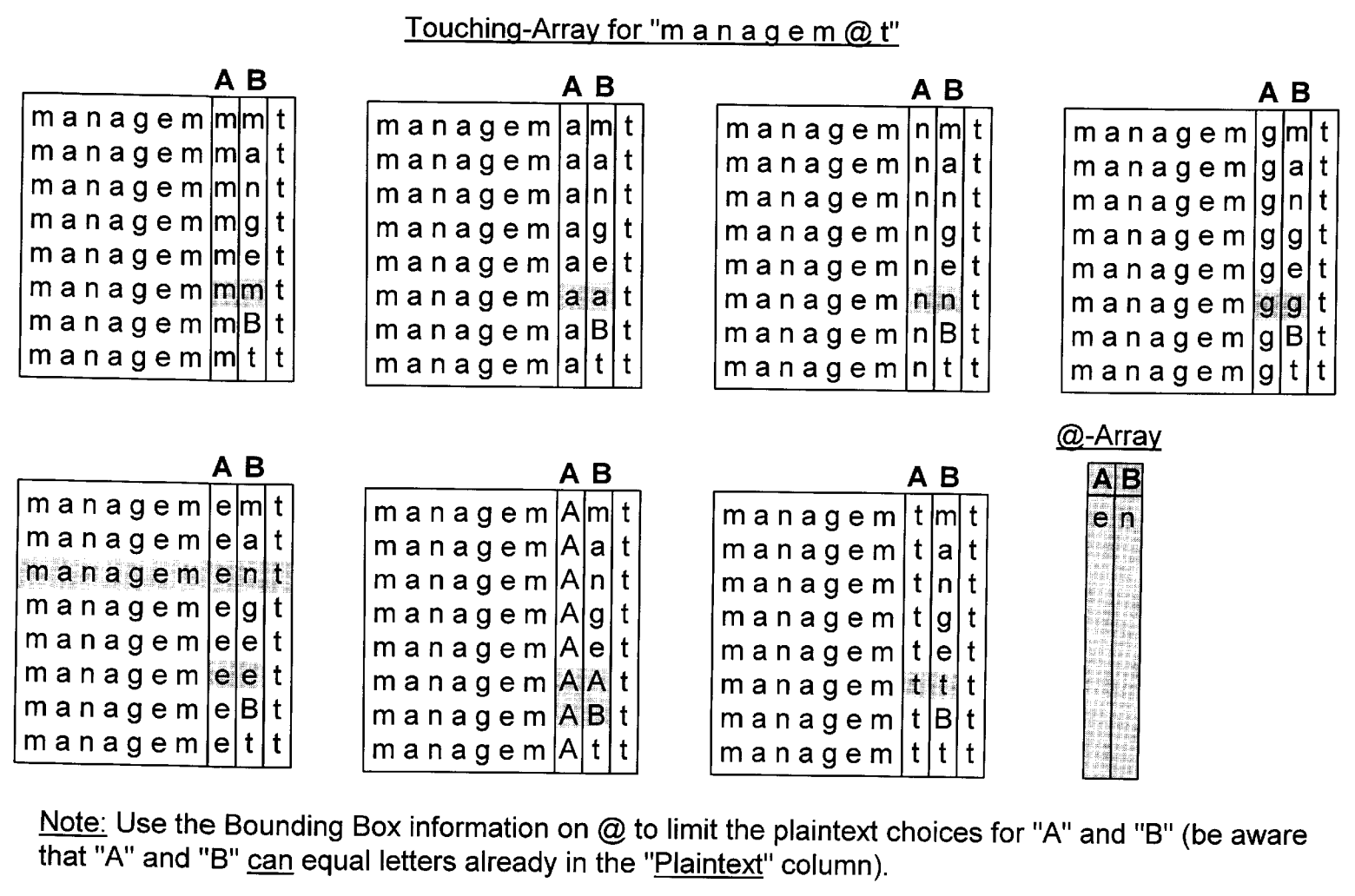

Touching-Array for "managem@t"

FIGURE 33

Note: Use the Bounding Box information on @ to limit the plaintext choices for "A" and "B" (be aware that "A" and "B" can equal letters already in the "Plaintext" column).

FIGURE 34

| 1 NP-Array | 2 NP-Array | 3 NP-Array | 4 NP-Array | 5 NP-Array | 6 NP-Array | 3 P-Array | 4 P-Array | 5 P-Array |
|---|---|---|---|---|---|---|---|---|
| A | AN | AND | FROM | ABOUT | SHOULD | ALL | BEEN | SHALL |
| I | AS | ANY | HAVE | AFTER | | | EVEN | THERE |
| | AT | ARE | INTO | COULD | | | THAT | THESE |
| | BE | BUT | LIKE | FIRST | | | WELL | WHICH |
| | BY | CAN | MADE | GREAT | | | WERE | |
| | DO | FOR | MORE | MIGHT | | | WILL | |
| | HE | HAD | MOST | OTHER | | | | |
| | IF | HAS | MUCH | THEIR | | | | |
| | IN | HER | MUST | THOSE | | | | |
| | IS | HIM | ONLY | WOULD | | | | |
| | IT | HIS | SAID | | | | | |
| | ME | ITS | SOME | | | | | |
| | MY | MAN | SUCH | | | | | |
| | NO | MAY | THAN | | | | | |
| | OF | NEW | THEM | | | | | |
| | ON | NOT | THEN | | | | | |
| | OR | NOW | THIS | | | | | |
| | SO | OLD | THEY | | | | | |
| | TO | ONE | TIME | | | | | |
| | UP | OUR | UPON | | | | | |
| | US | OUT | VERY | | | | | |
| | WE | OWN | WHAT | | | | | |
| | | | WHEN | | | | | |
| | | | WITH | | | | | |
| | | | YOUR | | | | | |
| | | SHE | | | | | | |
| | | THE | | | | | | |
| | | TWO | | | | | | |
| | | WAS | | | | | | |
| | | WHO | | | | | | |
| | | YET | | | | | | |
| | | YOU | | | | | | |

FIGURE 35

ISOMORPHIC PATTERN RECOGNITION

RELATED APPLICATIONS

This application claims priority to the provisional U.S. patent application entitled "Isomorphic Pattern Recognition," by inventor Floyd S. Hall, having serial No. 60/028,649, and having filing date Oct. 16, 1996, now abandoned. This application also claims priority to the provisional U.S. patent application entitled "OCR Metafile Format," by inventor Floyd S. Hall, having serial No. 60/028,578, and having filing date Oct. 16, 1996 now abandoned. This application also claims priority to the provisional U.S. patent application entitled "Using Pattern Tags to Provide Full-Text Searching of Raster Words that are difficult to Recognize," by inventor Floyd S. Hall, having serial No. 60/028,575, and having filing data Oct. 16, 1996 now abandoned. Each of the aforementioned three provisional applications is hereby incorporated by reference. This application is related to U.S. patent application entitled "A File Structure for Scanned Documents," by inventors Floyd Steven Hall, Jr. and Cameron Telfer Howie, having filing data Oct. 8, 1997 and a Ser. No. 08/946,680, now pending, which is incorporated herein by reference.

FIELD OF THE INVENTION

The present invention relates to systems and methods for pattern recognition, and more specifically to systems and methods for character recognition using Isomorphic Pattern Recognition.

DESCRIPTION OF RELATED ART

Traditional recognition technologies, such as Optical Character Recognition (OCR) technologies, attempt to determine the mapping between raster (image) letters within a raster document, and letters within a Character Encoding Scheme, such as ASCII, for example. Products based on these traditional technologies, however, have not been as successful as hoped in the mainstream marketplace. The reason is due to the extremely high degree of discontinuity inherent in their adoption by organizations, and the inability of companies to lower this barrier to the early majority of mainstream customers. This discontinuity is caused by bottlenecks including the following:

1. Recognition speed is too slow to be practical in paper-intensive organizations.
2. The tremendous time required to recognize vast collections of differing fonts and type sizes.
3. Recognition accuracy is too sensitive to skewed, faded, and noisy raster (image) documents.
4. Page-by-page checking for recognition errors requires tremendous human resources. Cannot automate process.
5. The need for manual indexing to ensure that output files are full-text searchable.

All five of these bottlenecks can be traced to the same root cause: the need, by traditional recognition technologies, to use the optical features (i.e, font) of each raster letter in order to determine its proper mapping. This statement is true regardless of whether the recognition technology uses Matrix Matching, Feature Extraction, Structural Analysis, or Neural Networking technologies, for example. What is needed is a technology which can overcome the aforementioned deficiencies of traditional recognition technologies.

SUMMARY OF THE INVENTION

The present invention is based upon the answer to an unintuitive question: Is it possible to determine the identity of a letter in a way that is independent of its optical features? For example, what if the letter "e" had its optical features altered within a raster document, and replaced everywhere with the symbol of a tiny rectangle having a silver dollar at its center. Would existing OCR technologies be able to determine that this unusual symbol represent plaintext "e"? The answer is clearly no, since the optical properties of this symbol look nothing like what traditional OCR technologies would expect for the letter "e". The present invention, however, correctly identifies this randomly chosen symbol as plaintext "e", quickly and accurately. This subtle insight, along with many others, allows a truly automated approach to recognition that is invisible to users, and acceptable to mainstream customers.

One embodiment of the present invention works as follows. A resource receives a plurality of representations of a plurality characters. A resource assigns a plurality of cipher labels to representations in the plurality of representations, and a resource identifies a plaintext identity of cipher labels in the plurality of cipher labels using pattern recognition. In one aspect of the invention the pattern recognition includes Isomorphic Pattern Recognition. In another aspect of the invention the resource that assigns the plurality of cipher labels to representations in the plurality of representations assigns a different cipher label to each different representation in the plurality of representations produces a plurality of cipher words. In still another aspect of the invention the resource that identifies the plaintext identity of cipher labels in the plurality of cipher labels includes a resource that creates sets of cipher labels selected from the plurality of cipher labels.

In another aspect of the invention the resource that identifies the plaintext identity of cipher labels in the plurality of cipher labels includes a resource that creates a Document Word List which contains cipher words in the plurality of cipher words. In still another aspect of the invention the resource that identifies the plaintext identity of cipher labels in the plurality of cipher labels includes a resource that selects a Selected Word from the Document Word List, the Selected Word containing at least one cipher label to be identified. In another aspect of the invention the resource that identifies the plaintext identity of cipher labels in the plurality of cipher labels includes a resource that creates a candidate plaintext word list of plaintext words in a plurality of plaintext words that have a same isomorphic pattern as a Selected Word. In still another aspect of the invention the resource that identifies the plaintext identity of cipher labels in the plurality of cipher labels includes a resource that selects a Trial Word from the Document Word List, the Trial Word containing at least one cipher label in common with the Selected Word.

In still another aspect of the invention the resource that identifies the plaintext identity of cipher labels in the plurality of cipher labels includes a resource that eliminates candidate plaintext words that cannot also form a valid plaintext Trial Word. In still another aspect of the invention the resource that identifies the plaintext identity of cipher labels in the plurality of cipher labels includes a resource that eliminates candidate plaintext words using a Raster-Plaintext Library wherein the Raster-Plaintext Library contains a plurality of raster letters and a plurality of plaintext identities for raster letters in the plurality of raster letters. In another aspect of the invention the resource that identifies the plaintext identity of cipher labels in the plurality of cipher labels includes a resource that substitutes a plaintext identity for identified cipher labels in cipher words in the plurality of cipher words in the Document Word List. In yet another aspect of the invention the resource that identifies the plaintext identity of cipher labels in the plurality of cipher labels includes a resource that attempts to identify cipher labels in the plurality of cipher labels until all cipher labels have been identified. In yet another aspect of the invention the resource that identifies the plaintext identity of cipher labels in the plurality of cipher labels includes a resource that assigns a Pattern Tag to a word in a Document Word List which contains unrecognized cipher labels, wherein the Pattern Tag represents a plaintext word which has a same cipher pattern as the word in the Document Word List being assigned the Pattern Tag.

Another embodiment of the invention comprises a memory, a resource for receiving a received cipher pattern, and a processor, wherein the processor identifies plaintext words in a plurality of plaintext words stored in the memory which have a same cipher pattern as the received cipher pattern. In another aspect of the invention the plaintext words in the plurality of plaintext words identified by the processor are isomorphic. Still another aspect of the invention comprises an imaging device which generates an image of a document, and the processor includes a resource that translates the image into a plurality of cipher patterns, and supplies the received cipher patterns to the processor. In yet another aspect of the invention the plurality of plaintext words includes words in more than one language.

Another embodiment of the invention comprises receiving a plurality of representations representing a document, the representations containing a plurality of characters, assigning cipher labels to characters in the plurality of character in representations in the plurality of representations, and identifying a plaintext identity of cipher labels in the plurality of cipher labels using pattern recognition. In another aspect of the invention pattern recognition includes Isomorphic Pattern Recognition. In yet another aspect of the invention assigning cipher labels includes assigning a different cipher label to each different representation in the plurality of representations. In still another aspect of the invention assigning cipher labels to characters in the plurality of characters in representations in the plurality of representations includes producing a plurality of cipher words. In another embodiment of the invention identifying the plaintext identity of cipher labels in the plurality of cipher labels includes creating a Document Word List which contains cipher words in the plurality of cipher words. A Selected Word is selected from the Document Word List, the Selected Word containing at least one cipher label to be identified. A candidate plaintext word list is created containing plaintext words in a plurality of plaintext words that have a same isomorphic pattern as the Selected Word. A Trial Word is selected from the Document Word List, the Trial Word containing at least one cipher label in common with the Selected Word. Candidate plaintext words that cannot also form valid plaintext Trial Words are eliminated. In another aspect of the invention identifying the plaintext identity of cipher labels in the plurality of cipher labels includes eliminating candidate plaintext words using a Raster-Plaintext Library wherein the Raster-Plaintext Library contains a plurality of raster letters and a plurality of plaintext identities for raster letters in the plurality of raster letters. When the invention determines the plaintext identity of cipher labels in cipher words in the plurality of cipher words, these plaintext identities are substituted into the cipher words in the Document Word List. In another aspect of the invention identifying the plaintext identity of cipher labels in the plurality of cipher labels includes assigning a Pattern Tag to a cipher word in the Document Word List which contains unrecognized cipher labels, wherein the Pattern Tag represents a plaintext word which has a same cipher pattern as the word in the Document Word List being assigned the Pattern Tag.

Still another embodiment of the invention comprises an imaging device which generates a representation of a document, the representation including a plurality of images of characters in the document, a processor coupled to the imaging device capable of receiving the representation of the document, the processor assigning a plurality of cipher labels to images in the plurality of images, and the processor using pattern recognition to assign plaintext characters to cipher labels in the plurality of cipher labels. In this embodiment, the pattern recognition may include Isomorphic Pattern Recognition. In another aspect of this invention the processor includes a resource which assigns a Pattern Tag to a cipher word in the Document Word List which contains unidentified cipher labels. In still another aspect of the invention the Pattern Tag represents a plaintext word which has a same cipher pattern as the word in the Document Word List being assigned the Pattern Tag. In yet another aspect of the invention the resource that identifies the plaintext identity of cipher labels in the plurality of cipher labels includes a resource that eliminates candidate plaintext words using a Raster-Plaintext Library wherein the Raster-Plaintext Library contains a plurality of raster letters and a plurality of plaintext identities for raster letters in the plurality of raster letters.

Another embodiment of the present invention works as follows. A raster document is converted into a ciphertext document wherein each raster character is related to a different ciphertext label. This converts words comprised of raster characters into cipher words comprised of ciphertext labels. A Document Word List is then created from the ciphertext document. The Document Word List contains one copy of each unique cipher word in the ciphertext document.

A word is chosen from the Document Word List which contains at least one cipher label which is desired to be identified. This word will be referred to as the Selected Word. The plaintext Isomorphic Dictionary is then used to identify candidate plaintext words that have the same isomorphic pattern as the Selected Word. Trial Words are then chosen from the Document Word List to eliminate unacceptable candidates from the list of candidate plaintext words. The Trial Word should have at least one cipher label in common with the Selected Word in order to help eliminate candidate plaintext words. For each Selected Word, Trial Words continued to be selected in an attempt to eliminate unacceptable candidates from the list of candidate plaintext words until only one candidate plaintext word remains.

In one aspect of the present invention, if all candidate plaintext words are eliminated or there are not enough Trial Words to eliminate all but one candidate plaintext word then the Selected Word is skipped and a new Selected Word is chosen.

If Trial Words are able to be used to eliminate all but one candidate plaintext word, then the one remaining candidate plaintext word is substituted back into the Document Word List in the place of The Selected Word. Additionally, the plaintext identities of the cipher labels identified in the Selected Word are then substituted throughout the ciphertext document and the Document Word List. A new Selected Word is then chosen and the process is repeated until all the cipher labels that can be recognized have been recognized.

In one aspect of the present invention, the longer words in the Document Word List are chosen first because they usually contain the greatest number of unique cipher labels to be identified. Also, longer Selected Words generally result in fewer candidate plaintext words, requiring fewer Trial Words to be selected and resulting in more cipher labels being identified. This speeds up the character recognition process.

In another aspect of the present invention, words in the Document Word List which still contain unrecognized cipher labels after all of the cipher labels that can be identified have been identified, are assigned a Pattern Tag. The Pattern Tag presents possible plaintext answers for the word and is useful, for example, when a full text search of the recognized document is performed.

BRIEF DESCRIPTION OF FIGURES

FIG. 4 shows a sample multi-language ciphertext document and a document word list generated from the document.

FIG. 5 shows relevant excerpts from a sample English German plaintext dictionary.

FIG. 6 shows cipher label-plaintext mappings and a copy of the document word list depicting selected word #I and Trial Word #I(1).

FIG. 7 depicts selected word #I and Trial Word #I(1) and their respective Inherited isomorphic patterns along with Candidate plaintext words from the dictionary.

FIG. 9 depicts selected word #II and Trial Word #II(1) and their respective Inherited isomorphic patterns along with Candidate plaintext words from the dictionary.

FIG. 10 shows cipher label-plaintext mappings and a copy of the document word list depicting selected word #III and Trial Word #III(1).

FIG. 11 depicts selected word #III and Trial Word #III(1) and their respective Inherited isomorphic patterns along with Candidate plaintext words from the dictionary.

FIG. 13 depicts selected word #IV, Trial Word #IV(1), and Trial Word #IV(2) and their respective Inherited isomorphic patterns along with Candidate plaintext words from the dictionary.

FIG. 15 depicts selected word #V, and Trial Word #V(1) and their respective Inherited isomorphic patterns along with Candidate plaintext words from the dictionary.

FIG. 16 depicts the solution mappings found as a result of the recognition and the plaintext identity of cipher words in the document word list.

FIG. 17 shows the "English"and "German" plaintext solutions.

FIG. 18 depicts an example of the use of the Library function to help identify the plaintext identity of cipher labels.

FIG. 19 depicts an embodiment of the invention in which a search engine recreates and searches a list of candidate plaintext words.

FIG. 20 is a blob showing the letter "c."

FIG. 21 shows two blobs and the results of the XOR operation.

FIG. 22 shows an image of a "t" touching an "n."

FIG. 23 shows an image of a non-composite "n."

FIG. 24 shows a sample Answer-Array.

FIG. 25 shows another sample Answer-Array.

FIG. 26 shows an array rearranged so that words having the most repeated letters appear first.

FIG. 27 depicts a Trial Word array.

FIG. 28 depicts an Isomorphic Array.

FIG. 29 shows that the Isomorphic-Array matches when A=B.

FIG. 30 shows that the Isomorphic-Array matches when A=B.

FIG. 31 shows the matrices used to generate the candidate plaintext answers for the Pattern Tag.

FIG. 32 shows a Sample TW-Array.

FIG. 33 shows a sample Touching_Array for "managem@t."

FIG. 34 shows the @-Array.

FIG. 35 shows an example of an array grouping of common word both non-pattern and pattern words.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
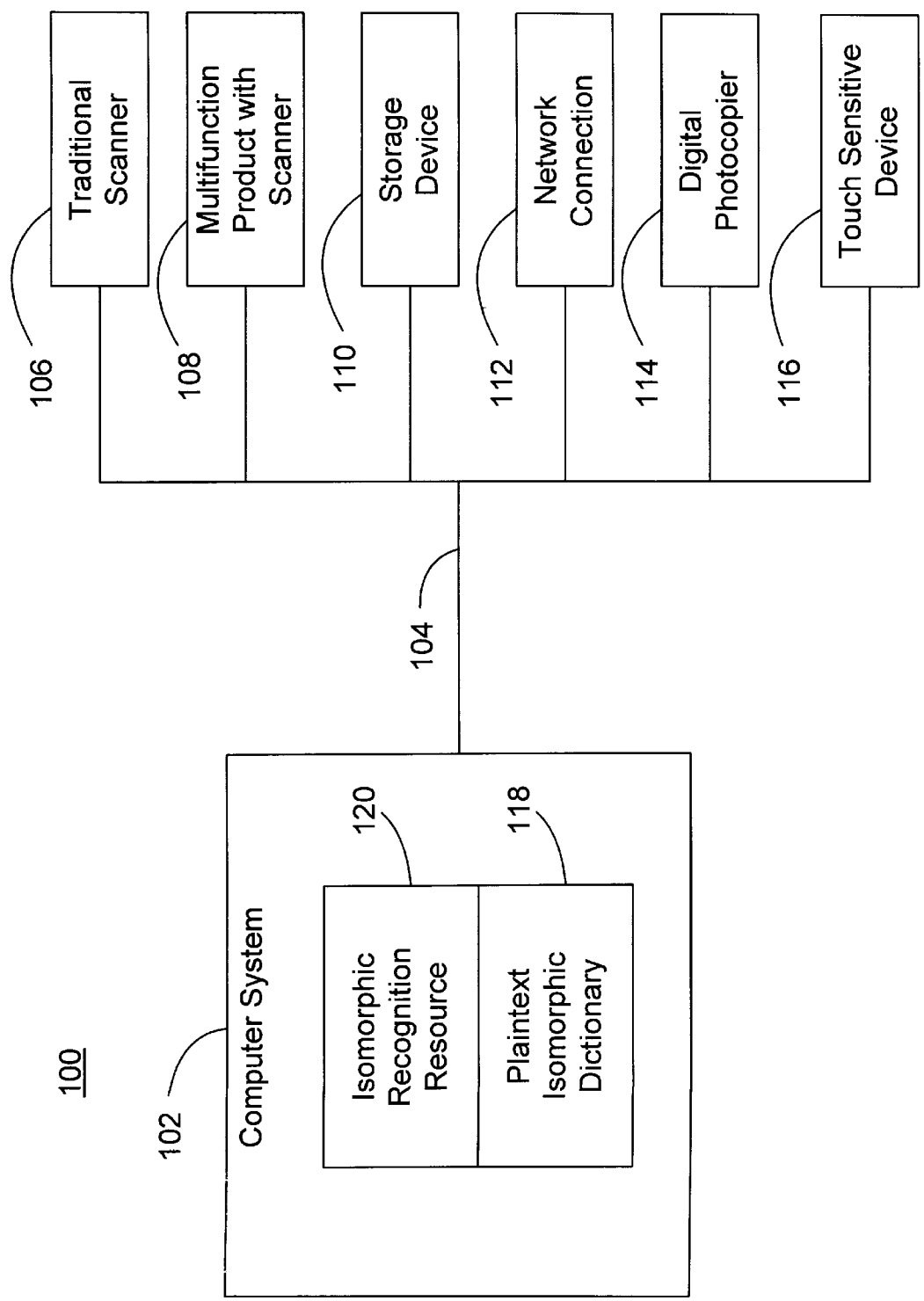
FIG. 1 is a schematic diagram representing an embodiment of the present invention depicting various possible input devices.

FIG. 1 is a diagram illustrating recognition system 100. In this embodiment of the present invention, computer system 102 is connected through cable 104 to one or more input devices. Input devices may include, but are not limited to traditional scanner 106, multifunction product with scanner 108, storage device 110, network connection 112, digital photocopier 114, or touch sensitive device 116, or any other device which can provide input to computer system 102. Without deviating from the present invention, any of these devices could be incorporated into computer system 102. Computer system 102 contains plaintext Isomorphic Dictionary 118 and Isomorphic Recognition resource 120. Optionally, computer system 102 may include a Raster-Plaintext Library. In one aspect of the invention recognition system 100 may include a hand-held screen input device. Such a device may create a raster document or representations directly from the images input on the screen.

Figure 2:
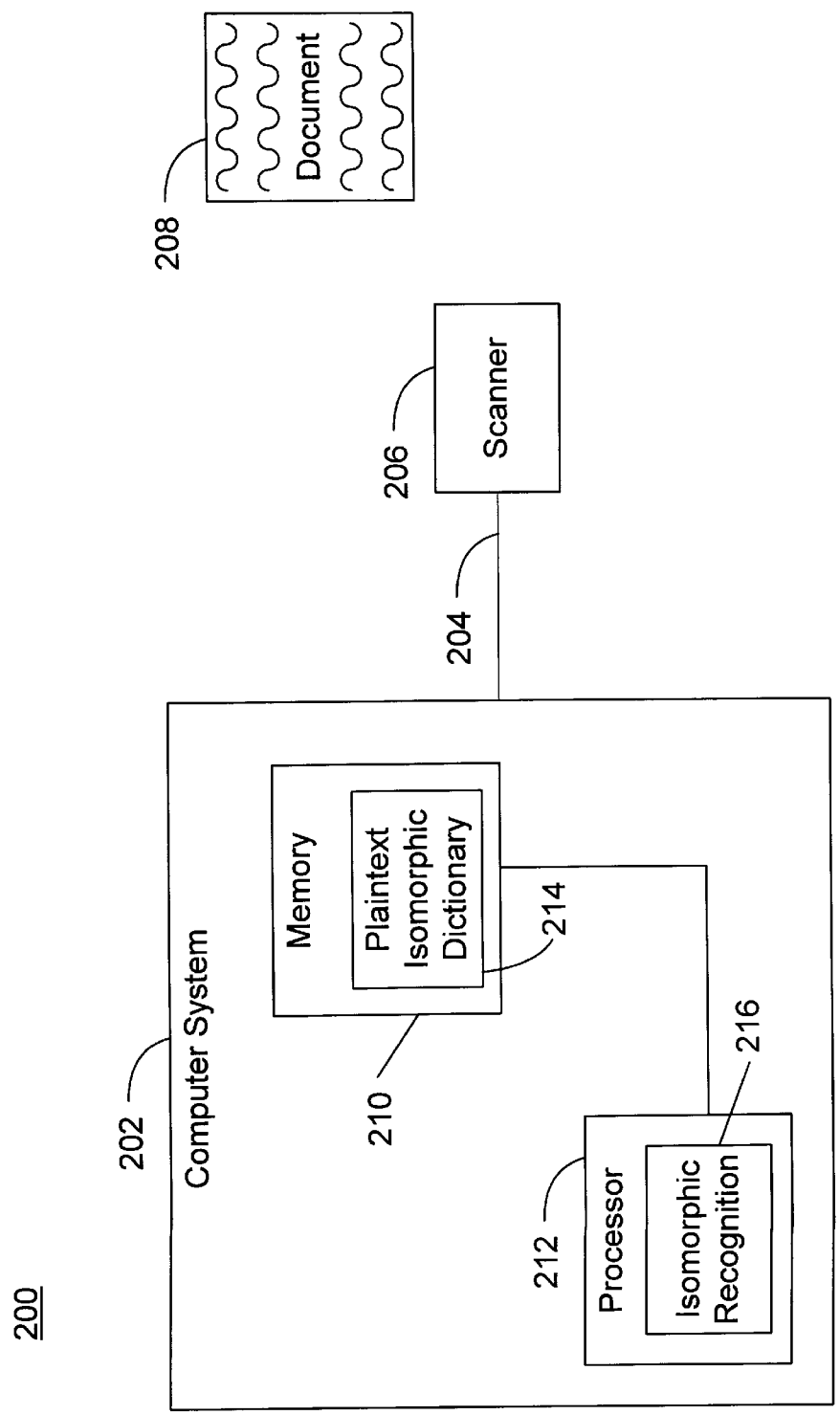
FIG. 2 depicts an embodiment of the system showing a document to be feed into a scanner attached to the computer system.

FIG. 2 depicts another embodiment of the present invention, recognition system 200. In this embodiment computer system 202 is connected through cable 204 to scanner 206. Document 208 contains characters in a plurality of characters which it is desired to recognized. Document 208 is fed into scanner 206. Scanner 206 converts document 208 into a plurality of representations which corresponds to characters in the plurality of characters in document 208. Representations in the plurality of representations are then transferred to computer system 202 through cable 204.

Representations in the plurality of representations are stored in memory 210 in computer system 202. Then, as discussed in detail below, processor 212 in computer system 202 then processes representations in the plurality of representations stored in memory 210 and used plaintext Isomorphic Diction 214 and Isomorphic Recognition resource 216 to help identify characters in the plurality of characters represented by representations in the plurality of representations. Additionally, computer system 202 may include a Raster-Plaintext Library.

Figure 3:
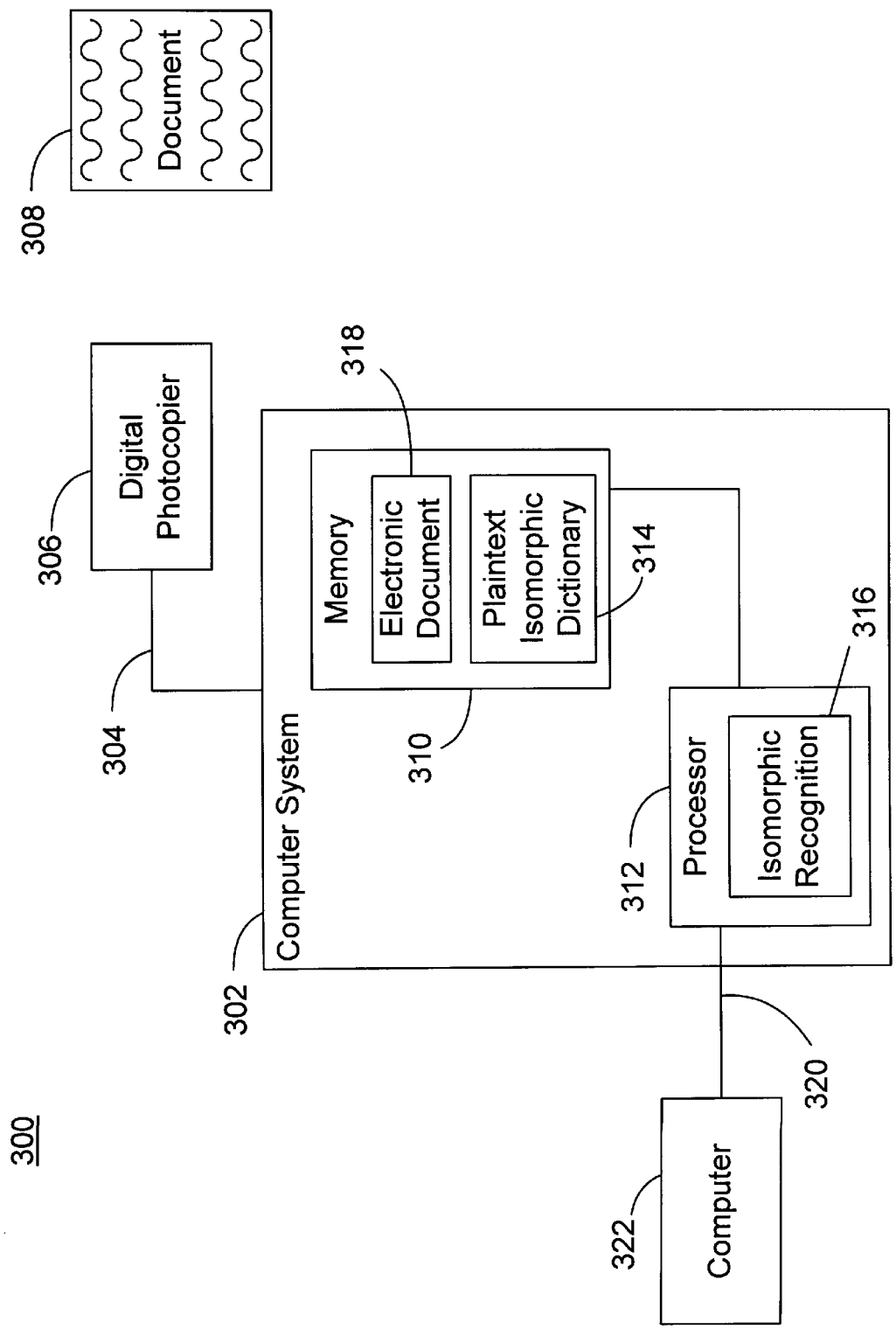
FIG. 3 shows an embodiment of the system in which the computer system has an external connection with another computer system.

Yet another embodiment of the present invention is shown in FIG. 3. FIG. 3 depicts networked recognition system 300. Networked recognition system 300 includes computer system 302 connected through cable 304 to digital photocopier system 306. Document 308 contains characters in a plurality of characters which it is desired to recognized. Document 308 is fed into digital photocopier 306. Digital photocopier 306 converts document 308 into representations in a plurality of representations which corresponds to characters in a plurality of characters in document 308. Representations in the plurality of representations are then transferred to computer system 302 through cable 304.

Representations in the plurality of representations are stored in memory 310 in computer system 302. Then, as discussed in detail below, processor 312 in computer system 302 processes representations in the plurality of representations stored in memory 310 and used plaintext Isomorphic Dictionary 314 and Isomorphic Recognition resource 316 to help identify characters in the plurality of characters represented by representations in the plurality of representations. Additionally, computer system 202 may include a Raster-Plaintext Library, and the Raster-Plaintext Library may also be used to help identify characters in the plurality of characters represented by representations in the plurality of representation.

In one aspect of the present invention, the identified characters in the plurality of characters are used to construct electronic document 318 corresponding to document 308. Electronic document 318 can be sent over network connection 320 to other computers 322. Network connection 320 can include local-area networks, wide-area networks, the Internet, or any other connection to a system external to computer system 302.

In one embodiment of the present invention, the mapping between cipher labels and plaintext letters in order to perform character recognition using the present invention proceeds as follows. A comprehensive plaintext Isomorphic Dictionary is constructed. This dictionary should be arranged so that all plaintext words in the dictionary having the same Root isomorphic pattern are grouped together. This plaintext Isomorphic Dictionary may also be multi-language, i.e. it may contain a superset of the words from many different languages, where each language is alphabetical in construction. This will allow multi-language ciphertext documents to be solved as easily as ciphertext documents in one language only.

A document is scanned into a recognition system, such as that shown in FIG. 2. The representations of the characters in the document are stored in memory 210. As discussed in detail below, processor 212 then uses the representations to construct a ciphertext document containing cipher words. A sample ciphertext document is shown in FIG. 4. A Document Word List, as shown in FIG. 4, is crated which contains one copy of each unique cipher word in the ciphertext document. This embodiment of the invention only has the information about the document contained in the representations, thus the cipher labels are unique, assigned to the representations based only on information contained within the representations.

A word is chosen from the Document Word List that contains at least one cipher label that we wish to recognized. This chosen word will be referred to here as the Selected Word. The comprehensive plaintext Isomorphic Dictionary is used to find all plaintext words that have the same Root isomorphic pattern as the Selected Word. FIG. 5 shows a sample of relevant excepts from an embodiment of a plaintext Isomorphic Dictionary containing English and German words. In FIG. 5, Root isomorphic patterns are represented by capital letters and plaintext words are represented by lower case letters. This list of plaintext words will be referred to here as the candidate plaintext words.

The goal is to attempt to determine which of these candidate plaintext words is the one correct answer being south, i.e. the correct plaintext substitute for the Selected Word. To accomplish this goal Trial Words are used. The Trial Words are chosen to help eliminate unacceptable candidates from among the list of candidate plaintext words. Each Trial Word is chosen from the Document Word List as depicted in FIG. 6. In addition, in multi-language ciphertext documents, each Trial Word is allowed to come from a language different from the language of the Selected Word. The only requirement is that each Trial Word must have at least one cipher label in common with the Selected Word. In the present embodiment, the solution methodology consists of examining each candidate plaintext word, one at a time, and eliminating those candidates that cannot also form a valid plaintext Trial Word. A plaintext word is considered valid if that word is contained within the comprehensive plaintext Isomorphic Dictionary.

This process is depicted in detail in FIG. 7. The Selected Word #I on the top line above is converted into its Inherited Isomorphic pattern. In the present embodiment of the invention, the inherited isomorphic pattern is equal to Root isomorphic pattern for this Selected Word. Using Group #1 in FIG. 5 all of the candidate plaintext words are listed for the Inherited isomorphic pattern. Each cipher label in Trial Word #I(1) that occurs also in the Selected Word #I (show in bold), inherits its identities from the Selected Word #I. Since "F" occurs in the Original patterns for both words, all entries in the vertical column below "F" in the Trial Word #I(1) are copied identically (i.e., inherited) from the Selected Word #I. Similarly for the other labels in "bold".

In the Inherited isomorphic pattern for Trial Word #I(1), "K" is chosen to represent "S" from the Original pattern, to distinguish it from the inherited labels ("L, M, etc." could also be used). Using Trial Word #I(1), we now see if its possible to eliminate any unacceptable candidate plaintext words. In the present embodiment of the invention, a candidate (for Selected Word) is eliminated whenever no valid Trial Word exists which fit the pattern located at the intersection of the row containing this specific candidate plaintext word, and the vertical Trial Word column. We stop choosing Trial Words when one candidate plaintext word remains (for the Selected Word). In one aspect of the invention Trial Words continue to be selected even after only one candidate plaintext word remains in order to verify that the remaining candidate plaintext word is the correct one.

Unlike the Selected Word #I, the Inherited isomorphic pattern for the Trial Word must first be converted into its equivalent Root isomorphic pattern before using the dictionary.

Inherited isomorphic pattern  J C D B A C *K* F C F

Root isomorphic pattern    A B C D E B F G B G

Figure 8:
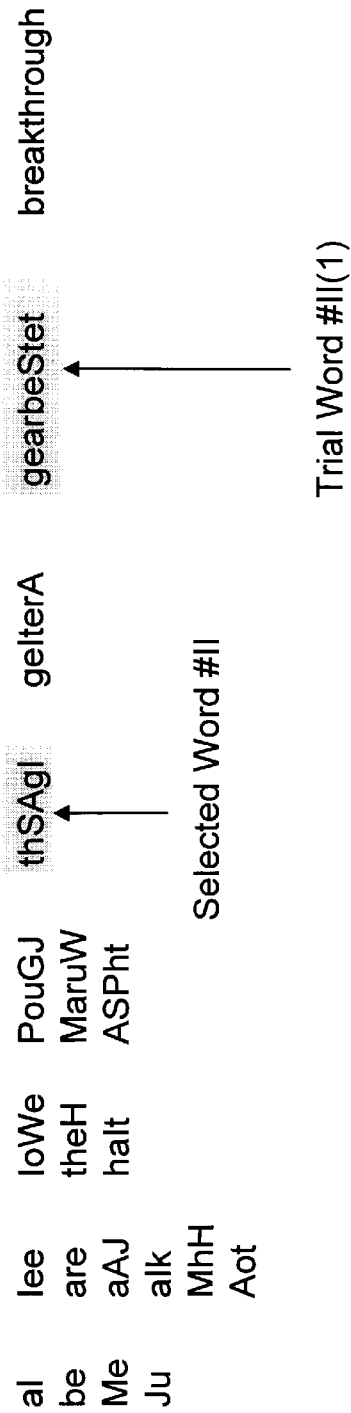
FIG. 8 shows cipher label-plaintext mappings and a copy of the document word list depicting selected word #II and Trial Word #II(1).

This Root isomorphic pattern implies that Group #2 in FIG. 2 (the dictionary) should be used. Therefore, Group #2 of FIG. 5 shows that the second (shaded) entry in FIG. 7 does not represent a valid Trial Word, so candidate #2 must therefore be eliminated. Thus, candidate #1 is the one correct answer for the Original pattern of the Selected Word #I. The mappings for the solution of the Selected Word #I are shown in FIG. 8.

For each Selected Word, Trial Words continue to be chosen in an attempt to eliminate additional unacceptable candidate plaintext words until one and only one candidate plaintext word remains. If only one plaintext word remains, then it is assumed to be the one correct answer being sought, and it is substituted in place of the Selected Word. This establishes a mapping between the cipher label(s) in this Selected Word and their plaintext identities (in the candidate word), i.e., we have performed character recognition on these cipher labels.

The plaintext identities of these cipher labels just recognized are then substituted throughout the ciphertext document (and the Document Word List), into all cipher words containing these cipher labels. This type of substitution process is equivalent to performing character recognition instantaneously, instead of sequentially, as is done in alternative recognition technologies. This approach helps to skirt the slow processing speed limitation of traditional recognition technologies.

If one of the scenarios in (a) or (b) below occurs, for a difficult-to-recognize Selected Word, then this difficult word is skipped, and a new Selected Word chosen, of one exists, and the recognition process described above is repeated. The plaintext identities of the cipher labels contained within this difficult-to-recognize Selected Word may be found when other Selected Words, containing these same cipher labels, are recognized. The scenarios are:

a. all candidate plaintext words are eliminated (perhaps because the one correct answer for the Selected Word is not in the comprehensive plaintext Isomorphic Dictionary)

b. there do not exist enough Trial Words to eliminate all but one candidate plaintext word.

The process of selecting Selected Words and Trial Words from the Document Word List is repeated until all cipher labels that can be recognized have been recognized. This is depicted in FIGS. 9–16. In FIG. 9 the Selected Word #II on the top line above is converted into its Inherited isomorphic pattern. Then, using Group #3 of the dictionary, list all appropriate candidate plaintext words for the equivalent Root isomorphic pattern of this Inherited isomorphic pattern. Then, using Trial Word #II(1), see if its possible to eliminate any unacceptable candidate plaintext words. Group #2 of the dictionary in FIG. 5 shows that the second (shaded) entry above does not represent a valid Trial Word, so candidate #2 must therefore be eliminated. Thus, candidate #1 is the one correct answer for the Original pattern of the Selected Word #II. The solution mappings are shown in FIG. 10.

Figure 12:
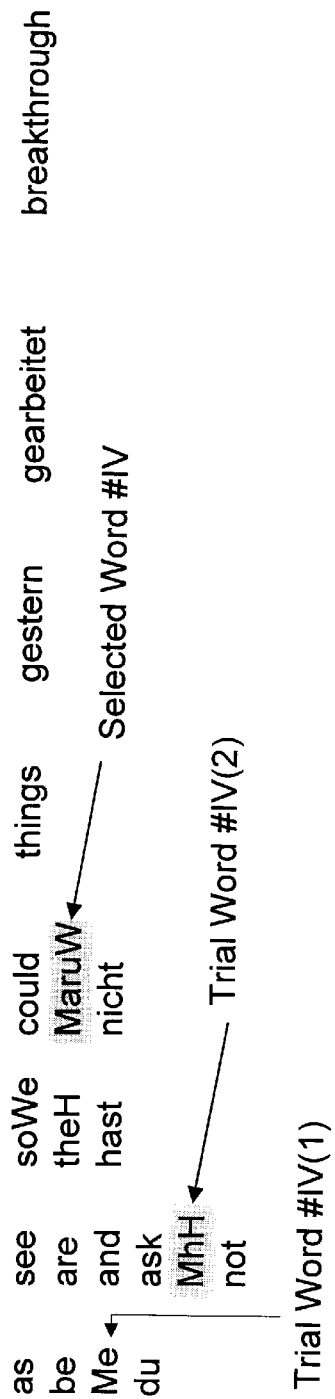
FIG. 12 shows cipher label-plaintext mappings and a copy of the document word list depicting selected word #IV, Trial Word #IV(1), and Trial Word #IV(2).

In FIG. 11, the Selected Word #III on the top line above is converted into its Inherited isomorphic pattern. Using Group #4 of the dictionary, all appropriate candidate plaintext words for the equivalent Root isomorphic pattern of this Inherited isomorphic pattern are listed. Then, using Trial Word #III(1), we now see if its possible to eliminate any unacceptable candidate plaintext words. Group #4 in the dictionary shows that the second and third (shaded) entries do not represent valid Trial Words, so candidates #2 and #3 must therefore be eliminated. Thus, candidate #1 is the one correct answer for the Original pattern of the Selected Word #III. The solution mappings are shown in FIG. 12.

Figure 14:
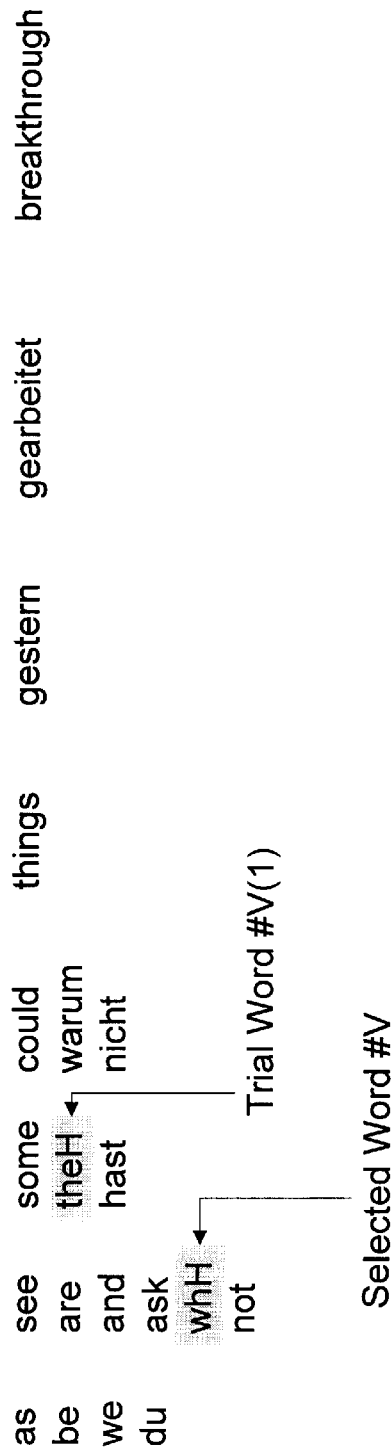
FIG. 14 shows cipher label-plaintext mappings and a copy of the document word list depicting selected word #V, and Trial Word #IV(1).

In FIG. 13 of the Selected Word #IV on the top line above is converted into its Inherited isomorphic pattern. Then, using Group #4 of the dictionary in FIG. 5, all appropriate candidate plaintext words are listed. Using Trial Word ·IV(1) and Trial Word IV(2), we now see if its possible to eliminate any unacceptable candidate plaintext words. Group #7 of the dictionary shows that both entries above represent valid Trial Words for Trial Word #IV(1), so no candidates are eliminated by this Trial Word. Thus, we must choose another Trial Word and continue. Group #6 of the dictionary shows that the first (shaded) entry in FIG. 13 does not represent a valid Trial Word for Trial Word #IV(2), so candidate #1 must therefore be eliminated. Thus, candidate #2 is the one correct answer for the Original pattern of the Selected Word #IV. The solution mappings are shown in FIG. 14.

In FIG. 15, the Selected Word #V on the top line above is converted into its Inherited isomorphic pattern. Then, using Group #6 of the dictionary, all appropriate candidate plaintext words are listed. Using Trial Word #V(1), we now see if its possible to eliminate any unacceptable candidate plaintext words. Group #5 of the dictionary shows that the first (shaded) entry in FIG. 15 does not represent a valid Trial Word, so candidate #1 must therefore be eliminated. Thus, candidate #2 is the one correct answer for the Original pattern of the Selected Word #V. The solution mappings are shown in FIG. 16.

Finally, each word in the Document Word List containing (unrecognized) cipher labels is assigned a Pattern Tag, which present possible plaintext answers for that word. Pattern Tags allow these words to be found during a full-text search of the recognized document. For example if a search is conducted in the document for a plaintext word. The use of Pattern Tags allows a search engine to return the appropriate plaintext result. If any cipher word in the Document Word List still has unidentified cipher labels, but is isomorphic with the plaintext word being searched for and the plaintext letters in the cipher word are the same as the plaintext letters in the search word then the Pattern tag will return the appropriate plaintext word.

In FIGS. 7, 9, 11 and "English" Selected Word was recognized (i.e., solved) using "German" Trial Words. In FIG. 13, a "German" Selected Word was recognized using "English" Trial Words. In FIG. 15, an "English" Selected Word was recognized using "English" Trial Words. This demonstrates that the present invention can recognize multi-language documents as easily as documents in one language only, for languages that are alphabetical in construction. Though not shown in the present example, it is possible, in certain circumstances, to extract plaintext identities from Trial Word results as well. FIG. 17 shows the results of character recognition, both the "English" plaintext solution and the "German" plaintext solution.

For performance reasons, the process described above involves choosing longer Selected Words first, which usually contain the greatest number of unique cipher labels. Then a greater number of plaintext identities can be recognized in less time. This is because solving the Selected Word reveals the plaintext behind a greater number of cipher labels, and longer Selected Words generally result in fewer candidate plaintext words, hence less Trial Word processing. However, without deviating from the present invention, the Selected Words could be chosen based on any suitable criteria, such as frequency, number of plaintext entries in the dictionary fitting the root isomorphic pattern, etc.

Another embodiment of the present invention uses a comprehensive Raster-Plaintext Library in order to attempt to identify which of the candidate plaintext words is the correct one. In one aspect of this embodiment, the Raster-Plaintext Library is used in addition to the use of Trial Words. In another aspect of the invention the Raster-Plaintext Library is used instead of Trial Words.

In this embodiment of the invention, the Raster-Plaintext Library contains extensive data on raster letters, and their plaintext identities, from an exhaustive collection of fonts. In one embodiment of the invention, a "Library Function" $L(R,P)$ can be defined as follows:

$$L(R, P) = \begin{cases} 1 & \text{if raster letter 'R' has plaintext identity 'P' in the Raster-Plaintext Library.} \\ 0 & \text{if raster letter 'R' does not have plaintext identity 'P' in the Raster-Plaintext Library.} \end{cases}$$

The raster letter 'R' and its equivalent cipher label 'C' will be used interchangeably in the "Library Function", i.e. $L(C,P)$ implies $L(R,P)$ and $L(R,P)$ implies $L(C,P)$, with the understanding that cipher label 'C' is just a convenient placeholder for the actual raster letter 'R'.

In this embodiment, when using the "Library Function" to analyze candidate plaintext word 'i', the following notation will be used:

$L(C_j, P_{ij})$, where $1 \leq i \leq N_{candidates}$, and $1 \leq j \leq N_{SW}$.

$C_j$=one instance of a cipher label in the Selected Word under consideration.

$P_{ij}$=candidate plaintext letter, within candidate plaintext word 'i', for cipher label $C_j$.

$N_{candidates}$=total number of candidate plaintext words for the Selected Word.

$N_{SW}$=total number of instances of cipher labels in the Selected Word.

This "Library Function" is used to help eliminate unacceptable candidates from among the list of candidate plaintext words generated as discussed above. Whenever a candidate plaintext word 'i*' ($1 \leq i* \leq N_{candidates}$) produces the value $L(C_j, P_{i*j})=0$ for any 'j' ($1 \leq j \leq N_{SW}$), it will be eliminated as a possible plaintext answer for the Selected Word under consideration. The one surviving candidate plaintext word 'i+', for which $L(C_j, P_{i+j}) \neq 0$ for all 'j' ($1 \leq j \leq N_{SW}$), is assumed to be the correct plaintext substitute for the Selected Word under consideration, and it establishes the mappings between the cipher labels contained within this Selected Word and their plaintext identities, i.e. character recognition has been performed just as is done using the Trial Words and Isomorphic Pattern Recognition.

In this embodiment, the plaintext identities of the cipher labels recognized are then substituted throughout the Document Word List, into all cipher words containing these cipher labels. This type of substitution process is equivalent to performing character recognition instantaneously, instead of sequentially (as is done in alternative recognition technologies). Selected Words continue to be chosen from the Document Word List until all cipher labels that can be recognized have been recognized.

FIG. 18 is an example showing the use of the "Library Function". In this example there are 3 cipher labels yet to be identified remaining in the Selected Word, cipher labels 04, 09, and 08, so $N_{SW}=3$. There are 3 Candidate plaintext words: "business", "cosiness" and "rosiness", so $N_{candidates}=3$. From the same library result shown in FIG. 18, the one surviving candidate plaintext word is i=1. This establishes the following mappings for the cipher labels: 04→b, 09→u and 08→e.

In the case in which the Raster-Plaintext Library does not contain one or roe raster letters represented by the cipher labels in the Selected Word under consideration, then the "Library Function" will eliminate all candidate plaintext words. In this case, the "Library Function" is not able to isolate the one correct answer from among the list of candidate plaintext words. In one aspect of the invention, however, to ensure that this one correct answer can be found during a full-text search of the document, a search engine will dynamically recreate and search the list of candidate plaintext words by using the Unrecognized Selected Word's cipher pattern, which will be stored in the scanned document's output file. This Unrecognized Selected Word's cipher pattern will be referred to here as its Pattern Tag.

FIG. 19 depicts one embodiment of the invention in which a search engine would recreate and search a list of candidate plaintext words for the Pattern Tag under consideration in accordance with the present invention. In this embodiment, if the Root isomorphic pattern of the Pattern Tag is identical to the Root isomorphic pattern of the Input Search Word and the plaintext letters in the Pattern Tag are identical to the plaintext letters in the Input Search Word then the search engine of this embodiment of the present invention will recreate and search the list of candidate plaintext words generated.

As shown in the example in FIG. 19, since the criteria for the search engine to create the list are met, the search engine will use the plaintext Isomorphic Dictionary to recreate the list of candidate plaintext words fitting the criteria. When this list is then searched, the Input Search Word is found even though cipher labels remained unidentified in the document. Of course, in certain situations, the Raster-Plaintext Library could be used to eliminate some of the spurious candidate Plaintext words recreated from Pattern Tags stored in the scanned documents output file.

Cipher Label Construction and Character Recognition

Below is a detailed description of another embodiment of the invention. First we will discuss the pre-processing stage in which the pixel images are isolated.

Pre-processing

In the discussion that follows, a 'blob' (or connected-component) is defined as a group of non-white pixels (assuming a white image background) that touch one another. For example, all of the black pixels in the shape of the raster letter 'A'. Also, an 'image' is defined as a raster image, perhaps generated by scanning a paper document, or it may be a pre-existing raster image.

Objectives

1) Strip out figures and other graphical elements (e.g., borders of a table)

2) Extract 'blobs' from a raster image.

3) For each blob pattern, identify its instances across the raster images of a raster document file.

4) Identify which blobs form words.

5) Identify which blobs are punctuation symbols.

6) Segment blobs which comprise more than one character.

These objectives are met using the following methods.

1) Stripping Graphical Elements from the Image

Several techniques have been published in the Image Processing literature for locating the different elements (e.g., tables, figures, paragraphs) with a raster image of a document. Some or all of these techniques will be implemented.

2) Extracting Character Blobs from the Image

The public-domain algorithm and supporting software provided by National Institutes of Standards and Technology (NIST) will be used.

3) Identifying Instances of a Blob

Each blob is returned by the NIST algorithm as a rectangular raster image. The dimensions of the blob image depend on the size of the printed character and the resolution at which the page was scanned. For example, a blob for the letter 'c' might have the image, as shown in FIG. 20 where the '0' values are white (background) pixels and the '1's are black pixels defining the letter. Given the raster image of a blob, it is possible to tell whether the image of a second blob is either:

(a) another instance of the first blob, or (b) an instance of a different blob.

This matching of blocks is accomplished using several fundamental image processing algorithms:

i.) 'Exclusive-OR' Matching

Exclusive OR (written 'XOR') is a mathematical operator that is used to compare pixels in binary images (i.e., images where pixels are either black or white). By overlapping the images of two blobs, the XOR operator returns a 'result' image that shows which pixels in the two images matched and which mismatched. In the XOR image, a '1' shows were pixels in the original images did not match and a '0' where they did. For example, consider the following two blob images shown in FIG. 21.

By examining the XOR result of pairs of blobs extracted from the image, it is possible to determine how closely they match one another. IF a pair of blobs matches after the XOR operation within a defined tolerance, the pair is deemed lo be instances of the same blob pattern. If the blobs mismatch, the further analyses is performed (see below) to determine whether or not they match.

ii.) Histogram Matching

Computer 'vertical' and 'horizontal' histograms of blob images and then compare these histograms for two blobs to determine whether they match or not. The histograms are simply measures of the number of black pixels in the image rows (in the vertical histogram) and columns (in the horizontal histogram). For example, the vertical and horizontal histograms for the two sample blobs shown in i.) above would be:

blob 1: vertical histogram: 5 1 1 5 horizontal histogram: 2 2 4 2 2 blob 2: vertical histogram: 1 1 1 3 horizontal histogram: 0 1 4 1 0

If the histograms show significant similarity, the pair of blob images is considered to be instances of the same blob, otherwise a potential mismatch is declared and further tests are applied to be certain.

iii.) Scanline Counts

A scanline count is defined to be the number of transitions from a black pixel to a white pixel while moving from left to right (vertical scanline measure) and from top to bottom (horizontal scanline measure) along a given row/column of pixels within a blob image. When reaching the end of a scanline at the edge of the image, the next pixel, were it there, is considered to be white. For example, the scanline counts for the two sample images above are:

blob 1: vertical scanline counts: 1 1 1 1 horizontal scanline counts: 2 2 1 2 2 blob 2: vertical scanline counts: 1 1 1 1 horizontal scanline counts: 0 1 1 1 0

Scanline information is very useful, for example, in distinguishing between the letter 'o' and 'c' since the vertical scanline measure will highlight the gap on the right side of the image for 'c', the feature that distinguishes it from an 'o'. Similarly, the horizontal scanline can show the differences between an 'h' and a 'b'.

iv.) Scatter Measure of the XOR Image

If the previous test have not indicated a clear (mis) match between two blob images, then the scatter is measured in the XOR image returned in i.) above. 'Scatter' is a measure of how spread out the black pixels are in the XOR image. In image processing terminology, a convolution of the filter is used to measure this 1 1 1
1 0 1
1 1 1 over the XOR image. This filter returns the number of black pixels within the eight neighboring positions of the pixel. Applying it to the XOR image in i.) above would yield the following matrix:

11211 . . . 22222 . . . 11011 . . . 01010

By summing the elements in the matrix, (in this case 22), a measure of the scatter is obtained for the XOR image. Blob pairs which mismatch will record higher scatter values than those found in the XOR images of matching blobs, permitting us to use a threshold in deciding upon a (mis)match classification for the blob pair.

4) Building Words from Blobs

'Baselines' are located for the characters within a paragraph using histograms that measure the locations of blob images relative to one another. This is standard practice in document recognition.

By examining the inter-blob spacing on each baseline, it is trivial to determine which blobs constitute the words on that line. The word structure information is stored in the Metafile (output file) so that the cipher words of the document are solved the moment the plaintext identities for the individual blobs are recognized.

5) Identifying Blobs that Represent Punctuation

All punctuation symbols exhibit distinct typesetting behavior. For example, any blob with an image that looks like a black circle, and where that blob lies on or close to a baseline (determined in 4 above), is considered to be a 'period' or 'decimal point'. Another example is a 'hyphen' which lies roughly midway between successive baselines and has a rectangular shape with a horizontal dimension considerably greater than its vertical one. Therefore by examining the relationships between blobs and baselines, it can be determined which blobs are punctuation symbols and which are not.

6) Segmenting Composite Blobs

Figures 22, 23:
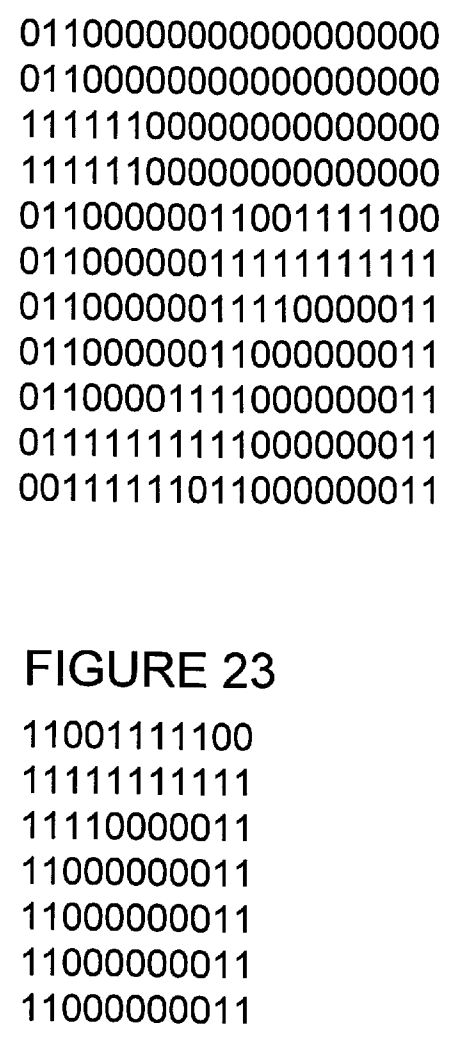

Due to the typesetting layout and insufficient resolution in the document scanner it is frequently the case that a blob image comprises more than one touching character. For example, the image in FIG. 22 shows a 't' touching an 'n':

By using our standard set of algorithms for finding matching blobs, it is possible to separate such touching characters using the blob image of one of the characters as it appears in individual form. For example, as shown in FIG. 23, the non-composite image for the above 'n' would be similar to the image shown in FIG. 23.

Matching this image over the right-hand side of the comprise image above leaves the remaining image of the 't' which will be can be verified by matching it against its non-composite form.

Answer-Array

1.) Answer-Array contains exactly 1 copy of each disguise (or cipher label).

2.) The contents of Answer-Array should remain available, even after recognition subroutine has ended, to ease analysis of future text in document. The contents are deleted only after the entire document has been processed.

3.) The moment that a "plaintext identity" is entered into the "Plaintext" column, this identity information is made available throughout the software instantly (globally): nP-Array, nNP-Array, LA-Array, etc., everywhere.

A sample Answer-Array is shown in FIG. 24.

No entry in any of the "lower case" or "upper case" possibilities columns can duplicate an answer in the "Plaintext" column in Answer-Array. Hence, there should be only a few "lower case" possibilities in this array, since there will be so many in the "Plaintext" column.

Box is a description of the physical attributes of the "Bounding Box" surrounding the raster connected-component character (disguise).

1=character in bounding box has an ascender. Ex: [b d h k l t "f" (sometimes)]

2=character in bounding box has a descender. Ex: [g j p q y "f & z" (sometimes)]

3=character in bounding box has neither an ascender nor a descender. Ex: [a c e i m n o r s u v w x "z" (sometimes)]

4=character in bounding box has both an ascender and a descender. Ex: [f (times italic) ly (touching characters)]

5=character in bounding box is most probably an upper case (Capital) letter. Ex: [A B C D E . . . ] (but could also represent [1 2 3 4 5 6 7 . . . ])

6=character in bounding box is most probably a punctuation mark, or a "special" symbol easily identified from box. Ex: [ ( ) { } [ ] . , : ; ' " ' " ! ? - — = % division sign (2 dots and a horizontal bar) multiplication dot]

7=character "may" be a Capital letter not found by preprocessing analysis, or it may be a low-frequency lower case letter with an ascender.

Plaintext is that specific plaintext identity that is either 1.) determined uniquely from TW-Array analysis, or 2.) selected from "lower case" or "upper case" possibilities, using traditional methods. This traditional method is not used, however, until after the last line of the last page of the entire document has been processed. We strategically delay using this traditional method until the end because our hope is that, by finding future words containing the disguise in question, we can use the TW-Array analysis to more "confidently" uncover the plaintext identity of this disguise. So, we leave this "Plaintext" entry blank, until we encounter a future word containing the disguise in question, or until we reach the end of the document and use the traditional method. If, after the entire document has been analyzed, any "Plaintext" entry is left "blank" in the Answer-Array, then this implies that the disguise should be left as a raster image.

If, for a given Disguise, the entire Row of Answer-Array is empty, then it is overwhelmingly probable that the disguise is a Symbol!!!

Plaintext identities using traditional techniques

To determine "font metric" characteristics, use the Bounding Box, histogram, and pixel densities for the letter "e". By using this information, we can select the closest matching font, and we can synthesize it as well, i.e., we can select the 1 font that most closely approximates the font of the present text. Now that the specific font has been chosen, synthesize the entire alphabet associated with this font: This includes lower case letters, upper case letters, numbers, punctuation marks, and symbols. Using this alphabet, we can now complete the verification using traditional techniques, as required in the above Answer-Array analysis.

Unlike the approaches by other vendors, we know in advance what the only acceptable plaintext possibilities are for each disguise!! This further increases the accuracy of results, and also the computational speed of the software!

If for any disguise, the entries for "lower case" and "upper case" possibilities are empty, this implies that the disguise is mot probably a Symbol, since punctuation marks are already known.

EXAMPLE

If LA-Array has the word "Qt", and Q appears nowhere else in document, then we first try to limit plaintext possibilities by using the physical attributes of the Bounding Box of this character. If this gives a unique answer we stop. Otherwise this word is verified at the end of the document.

The sample answer array for this example is shown in FIG. 25.

Separating Fonts

1a.) Create a Triliteral Frequency Distribution for ALL the disguised text, repeated words as well.

1b.) Access the Preprocessing-Array. This array contains ALL "assumed" identities of punctuation marks and "some" special characters in incoming text.

1c.) Select 1st the highest frequency disguise in distribution (if it's not a punctuation mark). This disguise should be a central disguise, with both left and right contacts.

1d.) Put this 1st disguise in Answer-Array, and not that it is in font #1.

1e.) Analyze all contacts of occurrences of 1st disguise, excluding contacts with itself (this would create an infinite loop). Put 1 copy of each new disguise (from contacts, if any exist) in Answer-Array. Contacts are all in font #1.

(Note: Punctuation disguises are allowed in Answer-Array only when they are entered as contacts of non-Punctuation-Array disguises, not as central disguises! The only way that fonts can be accidentally intermixed is when punctuation marks are used as central disguises. This is because punctuation marks, like periods and commas, are often indistinguishable between fonts, and each can have contacts from more than one font simultaneously.)

1f.) These new disguises, from contacts of 1st disguise (if any exist), am referred to here as 2nd, 3rd, . . . kth.

1g.) Choose 2nd disguise as central disguise (if it's not a punctuation mark). Put 1 cop of each new disguise, from its contacts, in Answer-Array. They are font #1.

1h.) These new disguise, from contacts of 2nd disguise (if any exist), are referred to here as k+1th, k+2th, . . . , jth (k<j). All of which are in font #1.

1i.) Continue sequentially choosing central disguises, 3rd, 4th . . . , and analyzing the contacts of each, until ALL contacts for font #1 have been evaluated.

1j.) Now, only at this point, do we consider punctuation marks as central disguises. But only in the very specific scenario listed below!!

1k.) We consider only those punctuation marks as central disguises which have, as their left contact, a disguise previously classified as being in font #1 and which is not itself a punctuation mark. These very specific central disguises are referred to here as P1, P2, . . . , Pi. From this collection of disguises, select only those disguises (if any exist) that also have a right contact. Refer to this sub-collection of disguises as P1, P3, and P6 (6=<i). Analyze the right contact of each. If a new disguise is encountered, tag it as a member of font #1 in Answer-Array. Now, consider the contiguous right contact of each of the previous right contacts (if any exist) of P1, P3, and P6. If any new disguises are encountered, tag them also as members of font #1. Continue considering contiguous right contacts of right contacts of right contacts . . . of P1, P3, and P6, until no further right contacts exist.

1l.) This concludes the processing of collecting ALL the disguises which are members of font #1.

1m.) Continue repeating steps 1a–1l until ALL fonts are identified.

1n.) Now, for each font, rearrange all disguises, with highest frequency disguises occurring first and lowest frequency disguises occurring last in Answer-Array.

1o.) Be aware that single-letter Capital-letter words (that appears nowhere else in text), single symbols, and punctuation with no contacts, ALL appear as new fonts! But these new fonts may, in fact, be "identical" to neighboring fonts. We must determine if this is indeed the case at the end of the document, before any font metric information is calculated.

Note

There may exist "conflicts Among Fonts", created for example when punctuation marks, like parentheses, contact both letters and digits. The letters are in font #1, say, and the digits are in font #2. So the parentheses, therefore, provides a bridge between these two fonts, and have both fonts #1 and #2 listed beside them. This clearly implies that fonts #1 and #2 should, in fact, be the same font (font #1=font #2). We will not, however, unify these fonts until the conclusion of the analysis of the entire documents, when font metric information and document formatting is being determined. The reason is because these conflicts of fonts help us to identify which fonts (representing "letters") will be sent to the Recognition software, and which fonts (representing "digits") will not.

Separating Letters, Numbers & Symbols

A tiny array called a "Letter-Array" will contain each unique "number" of the font that will be sent to the Recognition software. Ex: Letter-Array=[1 2 4 7]. This implies that only words having disguises in fonts #1, 2, 4, and 7, will be sent to the Recognition software.

Note that it is only necessary to check the initial letter of each word, since it is assumed that entire word is in the same font!

Now, sequentially analyze each font in the Answer-Array. In ALL of the steps that follow (steps 1–4), we will be excluding from consideration ALL punctuation marks and symbols.

1.) Count the number of unique disguises in font #j (1=<j=<k), by counting the unique labels (unique "histogram" identities). Here, "k" is the last font in the Answer-Array.

2.) If for font #j, unique disguises=1, then skip it. Pattern software cannot handle only one disguise.

(Symbols occur most often where unique disguises=1. Must uncover identities of symbols using traditional techniques. Ex: & @ + # < > \ / | etc.)

3.) If for font #j, unique disguises>13, then this font contains "letters". Put this specific font # in the Letter-Array.

(The threshold 13 is chosen because digits and associated symbols will almost never exceed 13 disguises, excluding punctuation [- , ( ) . ] and symbol [%]).

4.) If for font #j, 2=<unique disguises=<13, then disguises can represent letters or digits (and perhaps symbols as well). To help decide which of the two choices we are dealing with, we ask (and answer) the following question, "Are all Bounding Boxes=1 or 5 for all disguises in font #j, Yes or No?".

If the answer is No, then this font most likely contains "letters". Put this specific font # in the Letter-Array.

If the answer is Yes, then this font can contain either "digits" or ALL Capital letter disguises. We must analyze this scenario further before deciding.

Check the following clues that point towards digits. If at least 1 match is made (from the list a–g below), then we "assume" the disguises are digits.

Otherwise, we assume they are letters.

a. Is there a percent sign % contacting at least 1 of these disguises?
Ex: 5.2% b. Is there a decimal point (period) whose "left contact" and "right contact" are both disguises within the group we are presently considering?
Ex: 6.4 c. Is there a comma whose "left contact" and 3 contiguous "right contacts" are ALL disguises within the group we are presently considering?And whose 4th contiguous "right contact" is not in this group? Remember that this group contains no punctuation marks or "space" characters.
Ex: 1,945 $13,078,929 7,451.57 −16,001 (98,702)

d. Is there a hyphen whose 3 contiguous "left contacts" and whose 4 contiguous "right contacts" are ALL disguises within the group we are presently considering? Ex: 743-1000 1-800-324-8663 (415) 733-9674 (this approach won't find (800) 552-IDEA, for example). We must also require that the 4th contiguous "left contact" and the 5th contiguous "right contact" Not be disguises within the group we are presently considering. Ex: Hence, the phrase "connected-components" will be excluded as a possible choice. However, this extra requirement will not exclude phrases like "NEVER-THE-LESS". But phrases like "Never-the-less" and "never-the-less" will never be considered, since these phrases do not contain ALL Capital letters!

e. Is there a hyphen with No "left contact" and whose contiguous "right contact" is a disguise within the group we are presently considering?

Ex: -743,100 -83.2 -.00415 E76 f. Is there a colon whose 2 contiguous "right contacts" are both disguises within the group we are presently considering? Ex: 2:30 9:16:22. (We can't find digits in the following format very easily, because we can't isolate the "backslash" from Bounding Boxes. Ex: 4/8/96 11/15/96).

g. Are there 2 hyphens, separated by exactly 2 disguises, whose 3 contiguous "left contacts" of the left hyphen, and whose 4 contiguous "right contacts" of the right hyphen, are ALL disguises within the group we are presently considering? Ex: 489-84-9956 (Social Security #). We must also require that the 4th contiguous "left contact" of the left hyphen, and the 5th contiguous "right contact" of the right hyphen, Not be disguises within the group we are presently considering.

If the answer to any of the above questions is Yes, i.e., if at least 1 match was made from the above a–g clues, then put this specific font # in the Digit-Array described below. If no match was made (ALL answers are No), then put this specific font # in the ALLCap-Array also described below.

A tiny array called a "Digit-Array" contains each unique "number" of the font that contains only digits. Font #s in this Digit-Array will not be sent to Recognition software. Rather, we must uncover the identities of disguises representing digits using the "traditional techniques". Ex: Digit-Array=[3 5 8].

A tiny array called an "ALLCap-Array" contacts each unique "number" of the font that contains only Capital letters. Words in this font will be sent to Recognition software, but we must be careful to record the "upper case" plaintext answers! Ex: ALLCap-Array=[6 9 10].

Capital Letters

The preprocessing analysis has already identified most, if not all, of the disguises representing upper case (Capital) letters, by using the physical attributes of bounding boxes (box=5). These "assumed" Capital letter disguises are contained in the Preprocessing-Array. The preprocessing analysis, however, will find only those Capital letter disguises located a) at the beginning of a paragraph b) immediately following a period and c) following a period and other punctuation marks. The preprocessing analysis will not find other Capital letter disguises. We must determine these other Capital letter disguises separately (if any exist), before sending text stream to the Recognition subroutine. This special handling of disguised Capital-letter words arises because these words create an opportunity for 1 "plaintext" letter to be represented by 2 totally different disguises, perhaps within the same word. And our pattern word software prohibits this scenario. Once the assumed disguises representing Capital-letters are isolated, a 7 will be placed in the "Box" column in the Answer-Array (replacing the pre-existing 1 in the Box), to notify us that this disguise may be a Capital letter.

To isolate the "assumed" disguises for Capital letters, which are not already in Preprocessing-Array (if any exist), the following steps are performed:

1.) Analyze all "right contacts" of hyphens (if any exist) for possible Capital letters.

2.) Access the Preprocessing-Array, which contains attributes of Bounding Boxes of individual characters.

3.) Analyze all of the initial disguises of each word in text stream. Preprocessing analyzes only some initial disguises of words (like those occurring at the beginning of paragraphs, or after a period, etc.)

4.) If the Bounding Box for this initial disguise is not equal to 5, but it is =1 or 3, then put it in Collection I, and record which font it belongs to. Only 1 copy of each valid disguise is allowed in Collection I.

5.) If the Bounding Box of this initial disguise is equal to 5, the skip it. Move on to the next word in text stream, if one exist.

6.) If the Bounding Box of this initial disguise is equal to 6, which means that it is an "assumed" punctuation mark, then skip over this and all other contiguous "assumed" punctuation mark disguises, until a non-punctuation mark disguise is encountered, within this same word (if one exists). If the Bounding Box for this non-punctuation disguise is equal to 5, then skip to next word in text stream. Otherwise, if it is =1 or 3, then put this disguise in Collection I as well, and record which font it belongs to.

7.) Rearrange ALL disguises in Collection I: For each font separately, place highest frequency disguises first, and lowest frequency disguises last. Refer to this new arrangement as Collection II.

8.) For each disguise in Collection II, analyze its left contacts from triliteral frequency distribution (excluding any contacts with itself, which would create an infinite loop). If the Bounding Box of at least 1 of these "left contacts" is not equal to 5 or 6, then eliminate immediately from consideration this original disguise from Collection II (i.e., an acceptable disguise (for a Capital letter) can only be preceded by another Capital letter or punctuation mark. Nothing else).

9.) Sequentially analyze all disguises in Collection II (which were the "central" disguises in step 8), eliminating unacceptable disguises as we proceed.

10.) Any remaining disguises in Collection II, if any exist, "may" be Capital-letters that were not captured in Preprocessing stage, or they may be low-frequency lower case letters with ascenders. For each of these disguises in Collection II, change the Bounding Box information so it's equal to 7.

Note

Words made up "entirely" of ALL Capital-letters can be analyzed in the same way as words made up "entirely" of ALL lower case letters (except that all their Bounding Boxes equal to 1 or 5.)

There can exist anywhere from 26–52 total disguises (representing "letters"), per font. However, since the pattern word software supports only 26 total disguises, we must convert ALL words containing these disguises into their isomorphs, to reduce the # of disguises which need to be supported by pattern word software.

The following example text will be used to motivate the above methodology:

By examining the perceptions and attitudes of individual managers, we can also expose inconsistencies and conflicts among company executives, and we can get a feel for the company's expectations. After finishing the internal audit, we typically conduct an "external audit" of key industry observers and potential customers to determine whether the company's goals and expectations are, in fact, realistic. (External audits will be discussed in greater detail later in this chapter.)

Preprocessing-Array=[B , '. A '( ) ] Only showing the relevant Bonding Boxes, which =5 for A and B, and =6 for the others in array.

Collection I=[t f k d E 1]

Collection II (Initially)=[t d 1 f k E]

Unacceptable Left contacts=[s o a n _ _]

Collection II (Final)=[k E] Each disguise in the final form of Collection II "may" represent an additional disguise for a possible Capital-letter.

For [K E], replace the 1 in each of their Bounding Boxes so that Bounding Boxes=7.

Input Text Stream

1.) Do not read into /Recognition software any word that is entirely plaintext.

2.) Strip off ALL punctuation marks from the "overall" text stream.

3. Remove all hyphens from the "overall" text stream in the following way: a) if hyphen occurs at the end of the sentence, "delete"it, and "combine" its contiguous left contact with its contiguous right contact, to form a single word. b.) otherwise, "delete" the hyphen and replace it with a "space character", thereby breaking all compound words and contractions into separate words. If any single letter words result from this process, then they should be eliminated (not read in), since the pattern software cannot handle them.

4.) The "overall" text stream can contain words from multiple fonts. Separate the "overall" text stream into "j" new text streams. There will be one text stream for each font # listed in the Letter-Array and the ALLCap-Array. Text Stream #a, Text Stream #2, ..., Text Stream #j. Here, Text Stream #1 contains "only" words having all of their letters in font #1. Text Stream #2 contains "only" words having all of their letters in font #2, etc.

5.) Each Text Stream will be analyzed separately in the Recognition software. After each Text Stream is finished being processed by the Recognition software, sequentially input the next Text Stream into the Recognition software until ALL text in the document has been processed.

6.) For Text Stream #q (1=<q=<j), check to ensure that each word is not too long for the pattern software. If so, skip it, Do not read it in!

7.) Separate Text Stream #q into pattern words and non-pattern words:

Pattern words go into nP-Arrays, where n=3-Pmax: 3P-Array contains 3-letter pattern words, 4P-Array contains 4-letter pattern words, etc.

Any 2-letter pattern words must be an Acronym, since no 2-letter intelligible pattern words exits in English.

Skip ALL 2-letter pattern words. Do not read them in!

Non-Pattern words go into nNP-Arrays, where n=2-NPmax: 3NP-Array contains 3-letter non-pattern words, etc.

Non-Pattern 1-letter words are excluded, since they cannot be analyzed with pattern word software.

Skip ALL 1-letter non-pattern words. Do not read them in! Only 1 copy of each pattern or not-pattern word goes into each of the nP-Arrays or nNP-Arrays.

8.) If there exist more than 1 pattern word in any one of the nP-Arrays, then rearrange each such array so that words having that most repeated letters appear first, as shown in FIG. 26.

All pattern words "tagged" as containing at least 1 "segmented pair of characters" are stored as the last entries in each nP-Array.

9.) If there exist more than 1 non-pattern word in any one of the nNP-Arrays, then rearrange each such array so words having the most "plaintext" letters appear first.

All non-pattern words "tagged" as containing at least 1 "segmented pair of characters" are stored as the last entries in each nNP-Array.

10.) Any pattern or non-pattern word that is entirely "plaintext", however, is simply deleted from the array. Words appearing first in array must have at least 1 disguised letter!

Solution Methodology

For each Text Stream #q (1=<q=<j), we seek to perform our analysis be selecting first only "pattern" words, if possible. Of these pattern words being considered, the longest pattern words are selected first and the shortest pattern words are selected last. We proceed in this fashion because the number of words which fit a longer pattern will be limited when compared to those which fit a shorter pattern word. In addition, a longer word contains more letters, making it easier to check the validity of answers.

The analysis begins by selecting the longest available pattern word, sending it through our pattern word software, and generating all the possible plaintext answers which fit this pattern. Our goal, essentially, it to find which of these possible plaintext answers is in fact the correct one. To prove or disprove the validity of an answer, we look for other words (focusing first on pattern words) which contain the same disguised-letters as those in Selected Word. The most desirable case, of course, would be to find a word made up entirely of disguised letters contained in the Selected Word. However, we proceed by looking first for the next longest pattern word which contains at least 1 disguised-letter in Selected Word. This, again, is done to increase computational speed, since longer pattern words have fewer answers which fit its pattern. These additional words, chosen strictly for verification purposes, are called Trial Words.

Our overall analysis will be performed within a Trial Word-Array (TW-Array). Using this array, we will examine each of the possible plaintext answers for the Selected Word, and eliminate those answers which cannot also form an acceptable Trial Word. We continue selecting additional Trial Words, and eliminating possible answers, until only one of the answers remains for the Selected Word. This is the one correct answer that we have been seeking. If, however, ALL possible answers are eliminated in this process, then something went wrong. Perhaps one of the words (the Selected Word or Trial-Words) was an acronym. Since we don't know which of these words caused the problem, we put them all into the LA-Array to be reconsidered later.

When considering non-pattern words as the Selected Word in TW-Array (disguised below), we do the following:

1.) choose the "longest" non-pattern word which has its initial letter already in "Plaintext" column of Answer-Array. In the event that no such non-pattern words exist, then 2.) reverse our earlier procedure for this moment only, and choose the "shortest" non-pattern word as the *Selected Word.*

When considering non-pattern words as Trail-Words in TW-array (disguised below), we do the following:

Choose the "longest" non-pattern word that has either 1.) its initial letter already in "Plaintext" column and it has at least 1 disguise that is the same as a disguise in the Selected Word, or 2.) its initial letter (disguise) is not already in "Plaintext" column, but it does appear in the Selected Word, or 3.) if the first 2 options are not available, then we simply choose the "shortest" non-pattern word that contains at least 1 disguise that is the same as a disguise in the Selected Word. Note that steps 1–3 apply separately to each new Trail-Word being selected, for a given Selected Word. All this is done strictly to increase computational speed of the software. Also, non-pattern words are selected only after ALL pattern words, containing at least 1 disguise that is the same as a disguise in the Selected Word, have been exhausted. See FIG. 27.

- 0=pattern word software found no acceptable plaintext words for this pattern.
- plaintext TW=pattern word software found 1-and only-1 acceptable plaintext word to this pattern.
- 2=pattern word software found two-or-more acceptable plaintext words for this pattern.
- Isomorph=Isomorphic Word, if initial letter of word is "lower-case" (Box not equal to 5), or if initial letter of word is Capital (Box=5) and word is exactly 2-letters in length.
- Isomorph=Isomorphic-Array, if initial letter of word is "Capital" (Box=5), and word is >2-letters.
- Important: Isomorphs (Words or Arrays), for each Trail-Words must be calculated for each Row, separately, of TW-Array!!!! Note: Whenever 0 occurs, the entire Row of TW-Array is eliminated immediately from further consideration.

The correct plaintext answer, for the Selected Word presently under consideration, is in the 1-and-only-1 surviving Row that did not get eliminated by any of the Trail-Words. It is the only Row containing no 0 entries. When we have isolated this one correct answer, look further along this same Row to see if any "plaintext TW" Trail-Words exist. If so, and if this Trail Word contains additional disguised-letters not in the Selected Word, then we have uncovered additional identities at no extra computational cost. If, however, we use ALL available Trail-Words (if any exist) and still have not reduced the TW-Array to one unique plaintext answer, then this specific Selected Word, presently under consideration, is eliminated from the TW-Array and placed in the LA-Array for further analysis later. The associated Trail-Words are not, however, put in the LA-Array. At this point, we choose another Selected Word (if one exists) and continue our analysis. Whenever, a word is put into the LA-Array, it must be deleted from its original nP- or nNP-Array.

If ALL possible plaintext answers for Selected Word are eliminated (i.e., all Rows contain a "0" entry), then something went wrong. There are six likely possibilities: (1) Incorrect Segmentation of characters contained in TW-Array (Selected Word or Trail-Words). (2) Touching Characters (usually involving low frequency letters). (3) Broken Characters. (4) Acronyms. (5) Words with Apostrophes (which must be "tagged" also). (6) Other (for example—preprocessing errors, such as assigning two different histogram labels (disguises) to the same lower-case (or upper-case) letter, for the same font).

Possibility (1) can arise only if there exist at least 1 "tagged" word in the TW-Array, and All Rows contain a "0" entry. When this scenario is encountered, we move immediately to the Resegmentation Algorithm discussed below, for further analysis, with the pre-existing words in TW-Array intacted. If, however, no "tagged" word exist, then we are dealing with scenario (2), (3), (4), (5), or (6). In this case, we put the Selected Word and its associated Trail-Words into the LA-Array. Within the LA-Array, the 1 of 5 specific scenarios that we are presently faced with will be determined, and referred to the appropriate algorithm for further analysis.

Note

In (1), the incorrectly segmented disguises, after they are resegmented correctly, may now have identities in "Plaintext" column, since those corrected disguises may have appeared in other words. In (2) the disguises will always remain disguises, until their plaintext identities are uncovered with a Broken-Array analysis.

All plaintext identities uncovered are put immediately into the "Plaintext" column, at the successful conclusion of each TW-Array analysis, for each Selected Word. The contents of Answer-Array should remain available, even after recognition subroutine has ended, to ease analysis of future text in document.

Isomorphic-Array

The following explains how the pattern word software can be used to analyze disguised variant words, where the variant-cipher letter may create 2 disguises for the same plaintext letter within the same word, even though the software was not designed to handle this scenario. Create an Isomorphic-Array for each variant-letter word greater than 2-letters, whether it be a Capital letter word, in the "Selected Word" or "Trail-Word", or a Pattern Tag, with 1 or 2 possible variants represented as raster letters, or a composite Touching Character representing two individual characters.

We use the notation: Isomorphic Array {Variant word, Number of variant letters (1 or 2), location of variant #1 (from left), location of variant #2 (from left)}.

Figure 28:
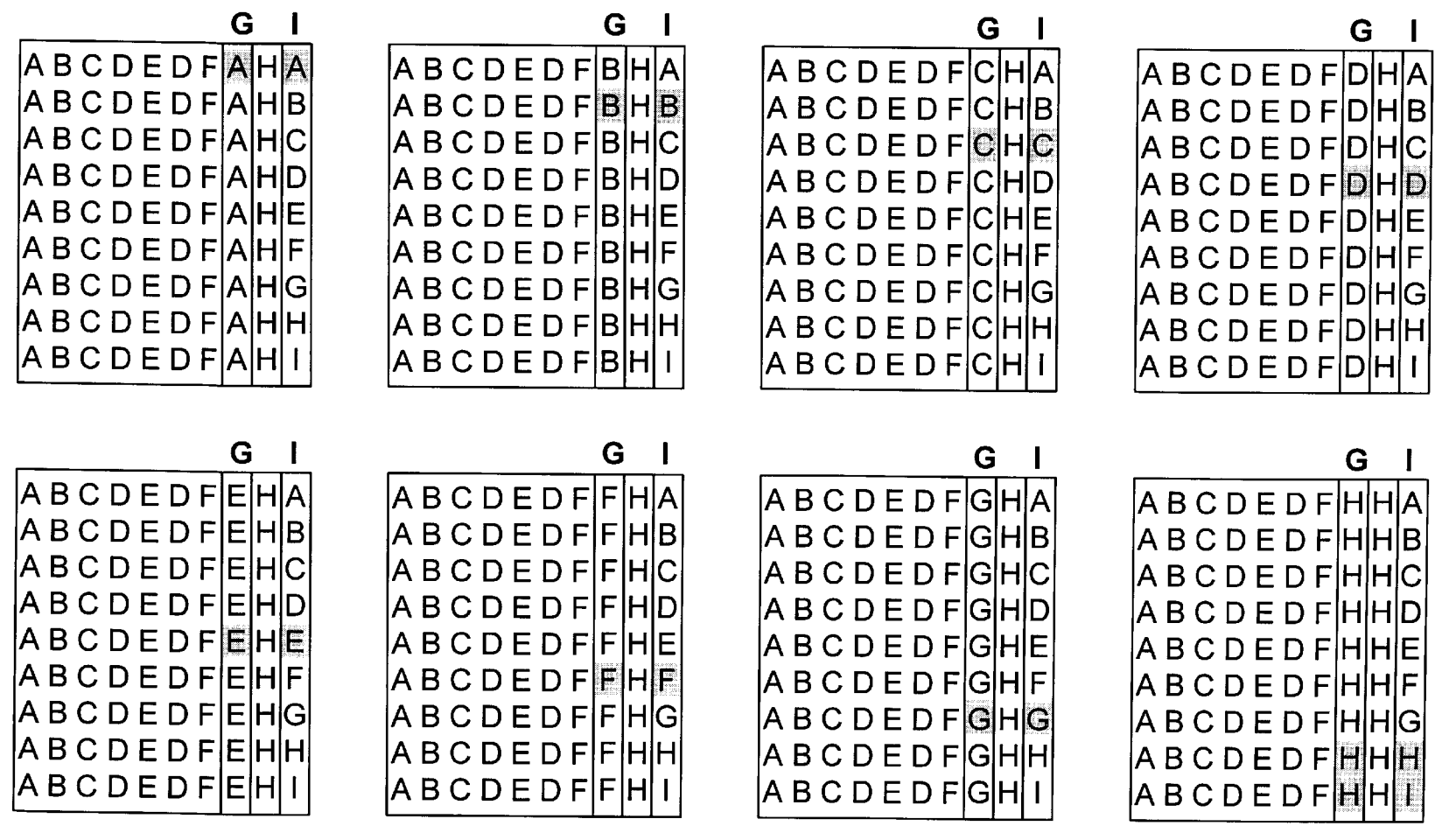

Example: Consider Isomorphic Array {A B C D E D F G I B, 2, 8, 10}. We create the Isomorphic-Array shown in FIG. 28 in the following way. Create an outer loop for the first variant label at location 8: "Outer Loop-G". for this outer loop, we need 1 matrix for each unique letter [A B C D E F G H], i.e., G=A, G=B, G=C, G=D, G=E, G=F, G=G, G=H. Notice that in the "outer loop", "G is not equal to I", since this would only duplicate information in the matrix G=G. For this "Inner Loop-I", we need the column vector (for each matrix) to have 1 entry for each unique letter [A B C D E F G H I], i.e., I=A, I=B, I=C, I=D, I=E, I=F, I=G, I=H, I=I. Notice that in the "Inner Loop", "I is equal to G"! ALL of the "possible" plaintext answers for "G" and "I" are generated from the pattern words in the matrices shown below. Note: "# of rows in each matrix=Total # of unique letters". In the special case when only 1 variant exists, as with Capital Letters, the entry for the "location of 1st variant' if left blank, implying only 1 matrix is considered!"

Example: Capital Letter

If for "Z", the Bounding Box=5, then we assume it may be a Capital Letter. So we consider the Isomorphic Array I{ZntHmHdatHon, 1, _, 1}. When the location for the first variant is let blank, this implies that there will be only 1 outer loop matrix (by default),and hence only 1 matrix total. Also, only 1 unique variant exists (for the Inner Loop), and it occurs at location 1 (first location in array).

Note: in the special case of Capital letter word, made up of 2-letters only, Isomorph=Isomorphic Word, in TW-Array (not Isomorphic-Array!) The reason no array is used is because there are no 2 letter pattern words in English.

I{ZntHmHdatHon} ZntHmHdatHon=AntAmAdatBon

The Bounding Box=5 for A. Thus I {ZntHmHdatHon, 1 ,_, 1} is equivalent to the fully expanded array!! As seen in FIG. 29, the only possible answer to this pattern occurs when A=B. So, this initial letter Z must necessarily be the disguise for the plaintext Capital-letter represented by the disguise H!

Using our pattern word software on the rows of this array, we find that: A=B=i, which is the same as Z=H=i. Here, Bounding Box=3 for i.

Note:

Without this Isomorphic-Array, the above pattern will be viewed as AntBmBdatBon. With this array, we can also consider the additional pattern AntAmAdatAon (and others).

Example: Pattern Tag (1 variant)

If "Z" is the 1 cipher label used in the Pattern Tag, then we consider the Isomorphic Array I {HntHmHdatZon, 1, _, 1}. When the location for the first variant is let blank, this implies that there will be only 1 outer loop matrix (by default), and hence only 1 matrix total. Also, only 1 unique variant exists (for the Inner Loop), and it occurs at location 9 (9th location in array).

I{HntHmHdatZon} HntHmHdatZon=AntAmAdatBon

The I{HntHmHdatZon, 1, _, 1} is equivalent to the fully expanded array!! As seen in FIG. 30, the only possible answer to this pattern occurs when A=B. Using our pattern word software on the rows of this array, we find that:A=B=i, which is the same as Z=H=i.

Note

Without this Isomorphic-Array, the above pattern will be varied as AntAmAdatBon. With this array, we can also consider the additional pattern AntAmAdatAon (and others).

Example: Pattern Tag (2 variants)

Figure 31:
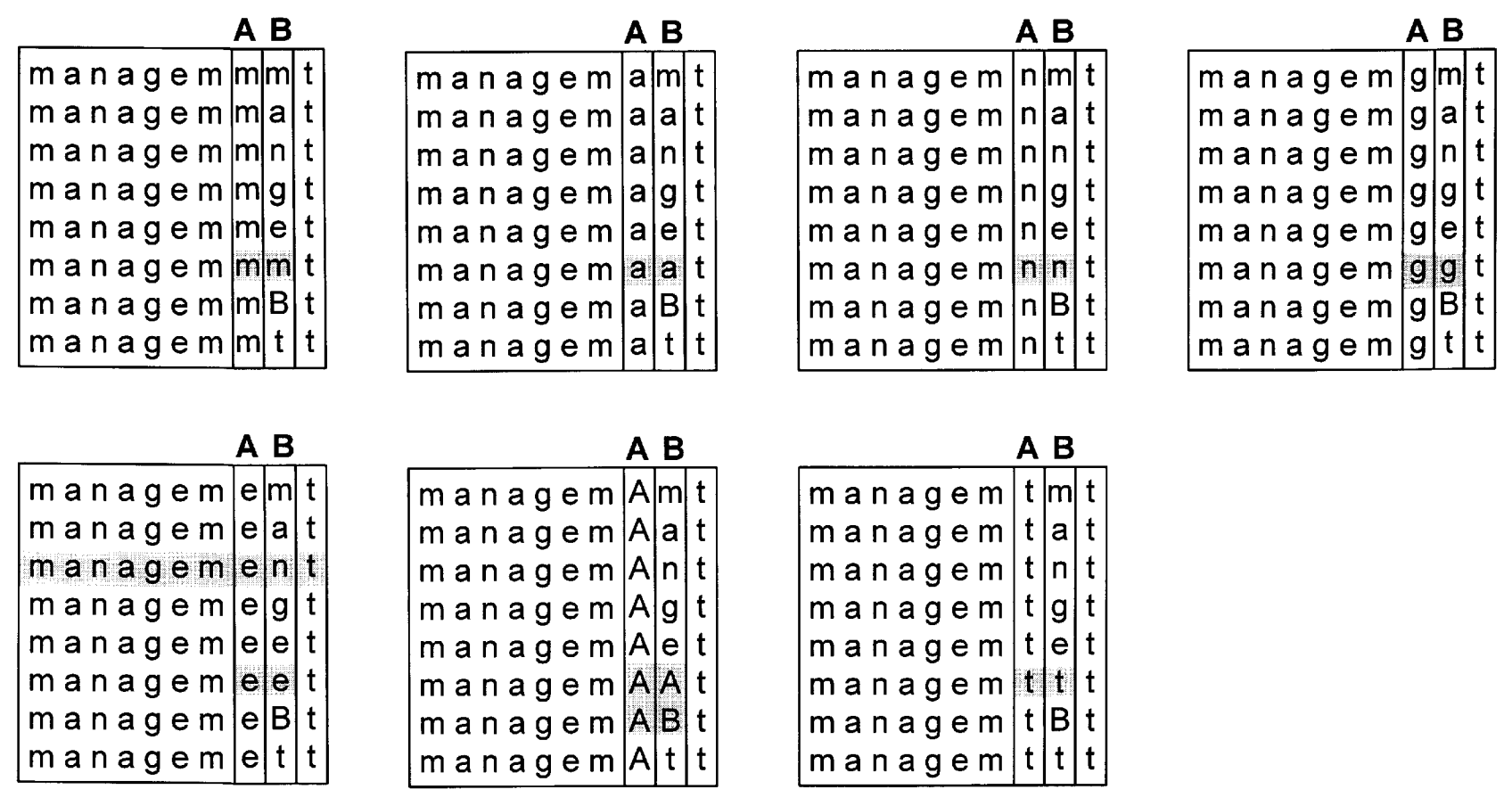

Assume we have a Pattern Tag that contains 2 cipher labels (Pattern Tags containing 1 cipher label is treated just like a Capital Letter). The search engine will put this Pattern Tag into the Pattern word software using the Isomorphic Array I{managem ABt, 2,8,9}. The list of candidate plaintext answers for this Pattern Tag are generated from the matrices shown in FIG. 31. We seek to uncover the identities of A and B. For the "outer loop-A", we need 1 matrix for each unique letter [mangeAt], i.e., A=m, A=a, A=n, A=g, A=e, A=A, A=t. Notice that in the "outer loop", "A is not equal to B", since this would only duplicate information in the matrix A=A. For the "inner loop-B", we need the column vector (for each matrix) to have 1 entry for each unique letter [mangeABt], i.e., B=m, B=a, B=n, B=g, B=e, B=A, B=B, B=t. Notice that in the "inner loop", "B is equal to A"!

Restrictions Placed Upon Plaintext Entries in TW-Array

The most important points to be made in this section are the following:

i. Only disguises representing lower-case letters can place restrictions on the plaintext identities of other disguises representing lower-case letters.

ii. Only disguises representing Capital letters can place restrictions on the plaintext identities of other disguises representing Capital letters.

iii. Only disguised letters within the Selected-Word can place restrictions on disguised letters within any Trail-Words that follow it.

iv. Disguised letters in any one Trail-Word cannot place restrictions on the disguised letters within any other Trail-Word.

6. Assume a disguise, say "L", represents a lower-case letter (Box not equal to 5) in font #j where 1=<j=<k. Assume further the "L" appears in at least 1 word in the TW-Array. Now consider the following:

a. If "L" appears in the Selected Word, then it is not allowed to have the same plaintext identity as a lower-case letter (Box not equal to 5) appearing in "Plaintext" column, for font #j.

Note: Pattern software automatically prevents different disguises, within the same word and each representing lower-case letters (Boxes not equal to 5), from having the same plaintext identities.

b. If "L" appears in a Trail-Word, then it is not allowed to have the same plaintext identity as a different disguise, say "B" (Box not equal to 5), where "b" has appeared in the Selected Word. In addition, "L" is not allowed to have the same plaintext identity as a lower-case letter (Box not equal to 5) appearing in "Plaintext" column, or front #j.

Note: The "Plaintext" column is updated only after the successful conclusion of a TW-Array analysis for a "specific" Selected Word. That is to say, only when there exist exactly 1 and only 1 surviving Row in TW-Array do we then update "Plaintext" column.

7. Assume a disguise, say "C", a Capital letter (Box=5) in font #j, where 1=<j=<k. Assume further that "C" appears as the initial letter in at least 1 word in the TW-Array. Now consider the following:

a. If "C" appears as the initial letter in the Selected Word, then it is not allowed to have the same plaintext identity as a Capital letter (Box=5) appearing in "Plaintext" column, for font #j.

Note: Isomorphic-Array, which uses pattern word software, does not prevent the Capital letter and a lower-case letter, within the same word, from having the same plaintext identities.

b. If "C" appears in a Trail-Word, then it is not allowed to have the same plaintext identity as a different Capital letter disguise, say "B" (Box=5), where "B" has appeared as the initial letter in the Selected Word. In addition, "C" is not allowed to have the same plaintext identity as a Capital letter (Box=5) appearing in "Plaintext" column, for font #j.

Consider the Following Example

A Sample TW-Array is shown in FIG. 32.

Note: It is always true that pattern word software automatically prevents different disguises representing lower-case letters, within the same word, from having the sample plaintext identities.

Selected Word: A B i. Neither A nor B is allowed to have the same plaintext identity as a lower-case letter (Boxes not equal to 5) already in the "Plaintext" column, for font #j. (pattern word software automatically enforces the restriction: A cannot equal B)

Trail-Word #1: B A C i. "A" and "B" in Trail-Word #1 have the same plaintext identities as "A" and "B" in Selected-Word, for each Row separately.

ii. C is not allowed to have the same plaintext identity as a lower-case letter (Boxes not equal to 5) already in the "Plaintext" column, for font #j. (pattern word software automatically enforces the restriction: A cannot equal B cannot equal C)

iii. C cannot equal A or B, since B cannot have the same plaintext identity as a different disguise, also representing a lower-case letter (Box not equal to 5), the Selected-Word.

Trail-Word #2: C a D B i. "b" in Trail-Word #2 hs the same plaintext identity as "B" in Selected-Word, for each Row separately.

ii. Neither C nor D is allowed to have the same plaintext identity as a lower-case letter (Boxes not equal to 5) already in the "Plaintext" column, for font #j. Note that lower-case "a" is already in "Plantext" column. (pattern word software automatically enforces the restriction: B cannot equal C cannot equal D cannot equal a)

iii. Neither C nor D can equal A, since C and D cannot have the same plaintext identity as a different disguise, also representing a lower-case letter (box not equal to 5), in the Selected-Word.

Trail-Word #3: I{C A D E e} i. "A" in Trail-Word #3 has the same plaintext identity as "A" in Selected-Word, for each Row separately.

ii. C is not allowed to have the same plaintext identity as a Capital letter (Box=5) already in the "Plaintext" column, for font #j. Note that lower-case "e" is already in "Plaintext" column.

iii. C cannot equal the Capital letter in Selected-Word (if it contains one), since C cannot have the same plaintext identity as a different disguise, also representing a Capital letter (Box=5). In the present case, however, no Capital letter occurs in the Selected-Word.

iv. Neither D nor E is allowed to have the same plaintext identity as a lower-case letter (Boxes not equal to 5) already in the "Plaintext" column, for font #j. (pattern word software automatically enforces the restriction: A cannot equal D cannot equal E cannot equal e). Note that C is missing from this list.

v. D and E cannot equal B, since D and E cannot have the same plaintext identity as a different disguise, also representing a lower-case letter (Box not equal to 5), in the Selected-Word.

Trail-Word #4: C D A E F i. "A" in Trail-Word #4 has the same plaintext identity as "A" in Selected-Word, for each Row separately.

ii. Neither C, D, E, or F is allowed to have the same plaintext identity as a lower-case letter (Boxes not equal to 5) already in the "Plaintext" column, for font #j. (pattern word software automatically enforces the restriction: A cannot equal C cannot equal D cannot equal E cannot equal F)

iii. Neither C, D, E, nor F can equal B, since C, D, E, and F cannot have the same plaintext identity as a different disguise, also representing a lower-case letter (Box not equal to 5), in the Selected-Word.

Trail-Word #5: I{C A D E F} i. "A" in Trail-Word #5 has the same plaintext identity as "A" in Selected-Word, for each Row separately.

ii. C is not allowed to have the same plaintext identity as a Capital letter (Box=5) already in the "Plaintext" column, for font #j.

iii. C cannot equal the Capital letter in Selected-Word (if it contains one), since C cannot have the same plaintext identity as a different disguise, also representing a Capital letter (Box=5). In the present case, however, no Capital letter occurs in Selected-Word.

iv. Neither A, D, E, nor F is allowed to have the same plaintext identity as a lower-case letter (Boxes not equal to 5) already in the "Plaintext" column, for font #j. (pattern word software automatically enforces the restriction: A cannot equal D cannot equal E cannot equal F). Note that C is missing from this list.

v. Neither D, E, nor F can equal B, since D, E, and F cannot have the sample plaintext identify as a different disguise, also represent a lower-case letter (Box not equal to 5), in the Selected-Word.

Resegmentation Algorithm

Resegmentation is required when there exist at least 1 "tagged" word in the TW-Array, and All Rows in contain a "0" entry. When the Resegmentation algorithm is called, it must go to work on a TW-Array with "pre-existing" Selected Word and/or Trail-Words. There are two cases that we must container.

Note: The instant when Resegmentation of a pair of letters occurs, transmit this information immediately throughout the entire document: All Algorithms and All Arrays! All "tagged" words containing "j" incorrectly segmented pairs will have their "word-lengths" reduced by "j" letters as well, after Resegmentation has occurred. Therefore, these words must be "shifted" to new nP-Arrays or nNP-Arrays (assuming that Resegmentation does not render word entirely plaintext, in which case we can eliminate it from Arrays). After Resegmentation, remove the "tags" from the Resegmented words.

Note: The "tag", which is attached to each word containing segmented pairs of letters, must specify the number # and the location of each segmented pair within each tagged word. It is "assumed" in (a) and (b) below, that the Resegmented plaintext letters [m w b W] are not already in "Plaintext" column! If this "assumption" is not satisfied, then immediately put the associated "tagged" word into the LA-Array.

1.) The selected Word is the 1st "tagged" word encountered in TW-Array. When Selected Word is a "tagged" word, we eliminate immediately All pre-existing Trail-Words from TW-Array, and choose new Trail-Words after Resegmentation of Selected Word is completed. This is done since all Trail-Words must contain at least 1 disguise that is "identical" to a disguise in the Selected Word. However, once Resegmentation of the Selected Word occurs, original disguises within Selected Word may be eliminated. This could render earlier Trail-Words as inappropriate for this newly Resegmented Selected Word.

(a) If 1 or both of the letters are plaintext in the incorrectly segmented pair, then we perform Resegmentation in the following way: If Bounding Boxes Pattern=3 3 and segmented pair has plaintext r_, _n, or r n, then Resegment this pair as the single plaintext letter "m". If Bounding Boxes Pattern=3 3 and segmented pair has plaintext v v, then Resegment this pair as the single plaintext letter "w". If Bounding Boxes Pattern=3 1 and segmented pair has plaintext c_, _1, or c 1, then Resegment this pair as the single plaintext letter "d". If Bounding Boxes Pattern=5 5 and segmented pair has plaintext V V, then Resegment this pair as the single plaintext letter "W".

(b) If neither of the letter are plaintext in the incorrectly segmented pair, then we perform Resegmentation in the following way: If Bounding Boxes Pattern=3 3 and segmented pair has identical disguises A A, then Resegment this pair as the single plaintext letter "w". If Bounding Boxes Pattern=3 3 and segmented pair has different disguises A B, then Resegment this pair as the single plaintext letter "m". If Bounding Boxes Pattern=3 1 and segmented pair has disguises A B, then Resegment this pair as the single plaintext letter "d". If Bounding Boxes Pattern=5 5 and segmented pair hs identical disguises A A, then Resegment this pair as the single plaintext letter "W".

2.) Trail-Word #j is the 1st "tagged" word encountered in TW-Array, where j=<1. (Selected Word is not "tagged") When Trail-Word #j is a "tagged" word, we eliminate immediately All Trail-Words that follow Trail-Words #j in the TW-Array, if any exist (i.e., we eliminate Trail-Words #j+1, Trail-Words #j+2, . . . ). Now, perform Resegmentation on Trail-Words #j itself. If, after Resegmentation, Trail-Words #j still contains at least 1 disguise identical to a disguise in Selected Word, then proceed to find all acceptable plaintext answers as usual, subject to the appropriate restrictions. If, after Resegmentation, Trail-Words #j no longer contains any disguises identical to a disguise in Selected Word, then remove this word from the TW-Array (through not from nP- or nNP-Arrays), choose a new Trail-Word, and proceed as usual. We continue choosing Trail-Words until a unique plaintext answer emerges for Selected Word, or the TW-Array analysis fails again, etc. Resegmentation is performed as described in 1(a) and (b).

Touching-Array

1.) Delete all words that are entirely plaintext!
2.) The only words allowed in this Touching algorithm are those words containing exactly 1 and only 1 disguise. Words containing 2 disguises are "assumed" to represent a single character which has been "Broken" into exactly 2-pieces only (i.e., 1 character is represented by 2 disguises). In words having exactly 1 disguise, this disguise may represent a "single letter", or it may represent a composite (touching) "pair of letters". In addition, this "Touching-Array" algorithm words only with "All Lower Case" or "All Capital Letters", not with "mixed"0 letters!
3. Prioritize all words to be considered for "Touching-Array" analysis. We consider the longest words first.
4.) A word "suspected" of containing 1 "pair" of touching letters may, in fact, just contain a "single letter", where the word containing it was tossed out of the TW-Array because there was not Trail-Word to verify its identity (perhaps because disguise is a low frequency letter). We have to allow for both possibilities.
5.) We proceed by creating an @-Array, which contains 2 vertical columns "A" and "B". Put this "suspect" word in the pattern word software without modification, i.e., we assume here that @ is a "single letter" disguise. For those plaintext answers which emerge, if any exist (excluding those plaintext answers already in "Plaintext" column), put these identities in the "B" column of the @-Array. Column "A" is intentionally left "blank" in this scenario. Next, create a "Touching-Array" (discussed below) for this word, by replacing @ by the pair "AB" i.e., we assume here that @ is a "pair of touching letters". For those plaintext answers which emerge, if any exist, put exactly 1 copy of these identities in both the "A" and "B" columns of the @-Array. It is important to note here that both "A" and "B" are allowed to have the same identities as letters already in "Plaintext" column! We also use Bounding Boxes information to restrict the allowable plaintext answers for these "pairs of letters". If the "touching-Array" analysis produces more than 1 answer, then using the "Postprocessing" analysis (discussed below), we can either identify the 1 correct "pair" of answers, or even further restrict the number of acceptable plaintext choices. These choices are then put into either the "lower case possibilities" or "upper case possibilities" columns for even further analysis later using traditional techniques. Ex: If pattern word software is used on the "suspect" word "managem@t", no answer emerges if @ is viewed as a "single letter". Now we must see if there exist answers when @ is viewed as a "pair of letters". So we perform the "Touching-Array" analysis for this word, which is shown below.

6.) If at the conclusion of the Touching-Array analysis, the @-Array contains exactly 1 and only 1 answer, then this 1 unique plaintext answer is put in "Plaintext" column. If the @-Array contains more than 1 answer, even after "Postprocessing", then put these choices into either the "lower case possibilities" or "upper case possibilities" column.

7.) To distinguish between the "single letter" possibilities and the "pairs of letters" possibilities, coexisting in the same columns in Answer-Array, the "pairs of letters" will be surrounded by parentheses!

Example: Consider "managem@t". Assuming that @ represents 1 pair of touching characters, we create the Touching-Array for the Alternative word "managemABt", and set Touching Array=I {managemABt,2,8,9}. We seek to uncover the identities of A and B. For the "outerloop-A", we need 1 matrix for each unique letter [mangeAt], i.e., A=m, A=a, A=n, A=g, A=e, A=A, A=t. Notice that in the "outer loop", "A is not equal to B", since this would only duplicate information in the matrix A=A. For the "innerloop-B", we need the column vector (for each matrix) to have 1 entry for each unique letter [mangeABt], i.e., B=m, B=a, B=n, B=g, B=e, B=A, B=B, B=t. Notice that in the "inner loop", "B is equal to A"! ALL of the "possible" plaintext answers for "A" and "B" are shown in the @-Array (including "single letter" answers, if any exist). Since there is exactly 1 unique answer in this array, put "@=en" in "Plaintext" column. If @-Array had had more entries for "pairs of letters", then we would have used the "Postprocessing" analysis to either choose the 1 correct "pair" representing the answer, or further limit the number of acceptable answers. A sample Touching-Array for "managem@t" is shown in FIG. 33.

Note: Use the Bounding Box information on @ to limit the plaintext choices for "A" and "B" (be aware that "A" and "B" can equal letters already in "Plaintext" column).

Example: Consider the phrase "the whi@paper". We suspect that whi@ may contain 1 pair of touching characters. Create the Touching-Array by considering 1.) @ as a "single letter" disguise in whi@, and 2.) @=AB as 1 pair of touching characters, with Touching Array=I {whiAB,2,4,5}. We seek to uncover the identities of A and B. In step 2, for the "outer loop-A", we need 1 matrix for each unique letter [whiA], i.e., A=w, A=h, A=i, and A=A. Notice that in the "outer loop", "A is not equal to B", since this would only duplicate information in the matrix A=A. Also in step 2, for the "inner loop-B", we need the column vector (for each matrix) to have 1 entry for each unique letter [whiA B], i.e., B=w, B=h, B=i, B=A, and B=B. Notice that in the "inner loop", "B is equal to A"! ALL of the "possible" plaintext answers for "A" and "B" are shown in the @-array (including "single letter" answers, if any exist).

Touching-Array for "whi@"

1.) @ as a "single letter" in whi@
@=[dgmnprtz]. However, if we assume for the sake of discussion that [dgmnrt] are already in the "Plaintext" column of Answer-Array, then they must be excluded as possible answers for @. The remaining 2 acceptable "single letter" answers are put into the "b" column of the @-Array.

2.) @=AB in whi@; "whiAB"

Figure 34:
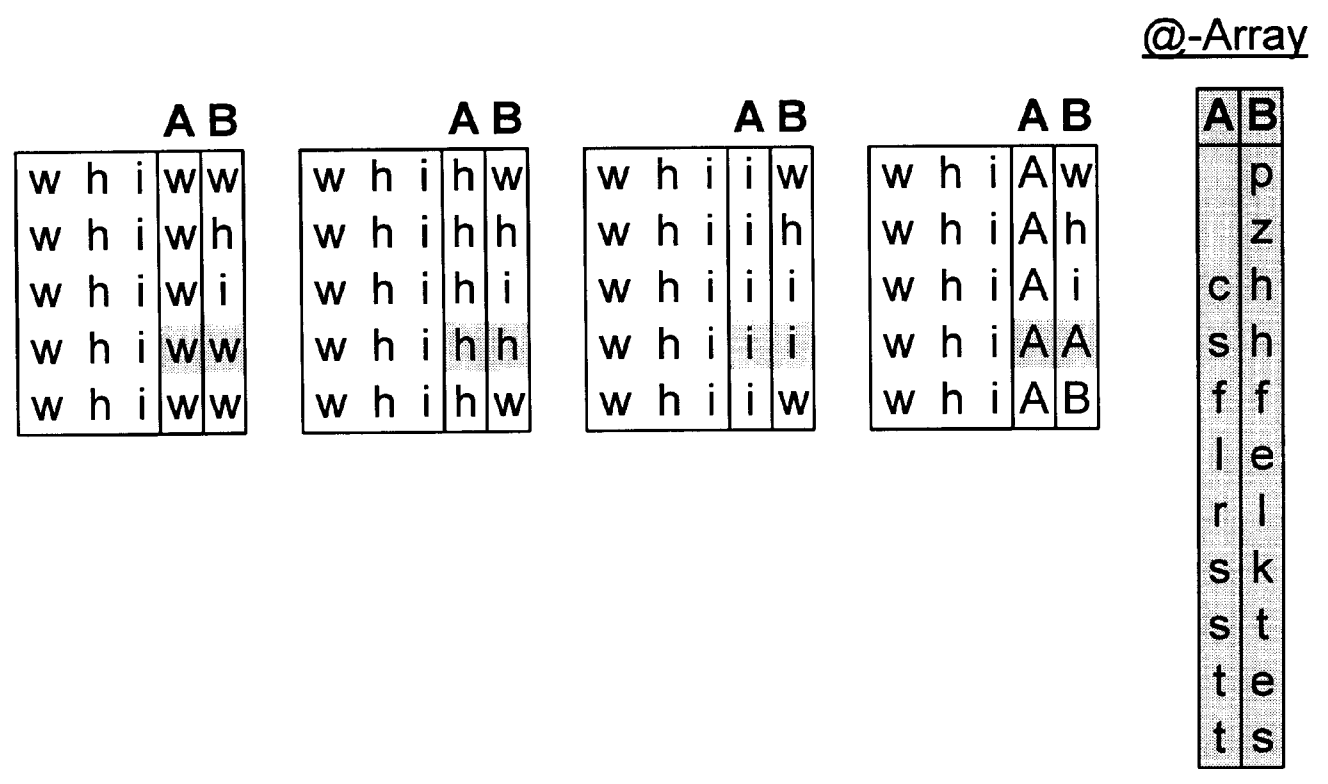

See FIG. 34

AB=[ch sh ff rr zz le ms ne ns ny ps rl rs sk st te ts ty]. For @, the Bounding Box=1.

Using this information, we can further reduce the number of acceptable plaintext answers for the AB pair. We eliminate immediately the single-letter plaintext answers [p z]. This reduced set of choices is placed in @-Array. Indeed, we can reduce this lest of choices even further by performing a "Postprocessing" analysis. If, the Postprocessing, there is still now 1 unique answer, then put these remaining choices into either the "lower case possibilities" or "upper case possibilities" columns of the Answer-Array.

Note

When @ is considered a "single letter", the plaintext answers are not allowed to be the same as letter already in "Plaintext" column in the Answer-Array. This restriction is removed, however, when @ is considered as a "pair of letters". Each letter of pairs is allowed to be the same as letters already in "Plaintext" column!!

"Broken-Array"

1.) Delete all words that are entirely plaintext!
2.) The only words allowed in this Broken algorithm are those words containing exactly 2 and only 2 contiguous disguises. Thus, words containing 1 pair of continuous disguises are "assumed" to represent a "single" character which has been "Broken" into 2-pieces only (i.e., 1 character is represented by 1 pair of disguises). In words having exactly 1 pair of contiguous disguises, these disguises may represent "2 single letters", or they may represent "1 single letter", once this pair of disguises is "recombined". In addition, this "Broken-Array" algorithm works only with "All Lower Case" or "All Capital Letters", not with "mixed" letters!
3.) Prioritize all words to be considered for "Broken-Array" analysis. We consider the longest word first.
4.) A word "suspected" of containing the 2 pieces of a broken letter may, in fact, just contain "2 single letters, where the word containing these letters were tossed out of the TW-Array because their was no Trail-Word to verify their identities (perhaps because these disguises are low frequency letters). We have to allow for both possibilities.
5.) We proceed by creating an AB-Array, which contains 2 vertical columns "A" and "B". Put this "suspect" word in the pattern word software without modification, i.e., we assume here that "A" and "B" are "2 single letter disguises". For those plaintext answers which emerge, if any exist (excluding those answers having letters already in "Plaintext" column), put these identities in the respective "A" and "B" columns of the AB-Array. Next, create a "Broken-Array" (disguised below) for this word, by replacing the "pair" of contiguous letters "AB" by the "single" letter disguise @, i.e., we assume here that "AB" is a "single" letter, which has been broken in half. For those plaintext answers which emerge, if any exist, put exactly 1 copy of these identities in the "B" column of the AB-Array. Column "A" is intentionally left "blank" in this scenario. It is important to note here that the "recombined" single letter disguise @ is allowed to have the same identity as letters already in "Plaintext" column! We also use Bounding Boxes information to restrict the allowable plaintext answers for this "single letter" disguise @. If the "Broken-Array" analysis produced more than 1 answer, then by performing a "Postprocessing" analysis, we can either identify the 1 correct "single" letter answer, or even further restrict the number of acceptable plaintext choices. These choices are then put into either the "lower case possibilities" or "upper case possibilities" columns for even further analysis later using traditional techniques.
6.) If at the conclusion of the Broken-Array analysis, the AB-Array contains exactly 1 and only 1 answer, ten this 1 unique plaintext answer is put in "Plaintext" column. If the AB-Array contains more than 1 answer, even after "Postprocessing", then put these choices into either the "lower case possibilities" or "upper case possibilities" column.
7.) If the AB-array contains exactly 1 answer, and this answer is a "single letter" answer, then the original 2 Rows containing the "broken pieces" must be "collapsed" into 1 Row, to accommodate this correct "single letter" answer!

Example: We "suspect" that the word "haABe" may contain a pair of contiguous disguises "AB" representing 1 broken character. Create the "Broken-Array" by considering
1.) "A" and "B" as 2 separate "single letter" disguises, and
2.) AB=@ as 1 recombined (originally broken) character in "ha@e", and we seek to uncover the identities of A, B, and @. Notice that we needed the column vector-B in step 2 to have an entry for each unique letter only [haBe], i.e., B=h, B=a, B=B, B=e. The plaintext answers for "A", "B", and @ are shown in the AB-Array.

Broken-Array for "haABe"

1.) "A" and "B" as 2 separate "single letter" disguises in "haAbE"

AB=[gu Is Iv nc ns rl rp st ut vr ws]. However, if we assume for the sake of discussion that [usncrptw] are already in the "Plaintext" column of Answer-Array, then they must be excluded as possible answers for both A and B (i.e., A cannot equal u, s, n, c, r, p, t, or w, and B cannot equal u, as, n, c, r, p, t, or w). The only remaining "2 separate single letter" answers are AB=[Iv]. However, using Bounding Boxes=3 ("ad hoc" guess), all of the "2 separate single letter" choices get eliminated!

2.) AB=@as 1 single letter in Broken-Array for: "ha@e" (or "haBe")

| B | AB-Array |
|---|---|
| h a h e <br> h a a e <br> h a B e <br> h a e e | A B <br> m <br> x |

B=[dklmrtvz]. For the recombined "AB", the Bounding Box=3 ("ad hoc" guess). Using this information, B=[mrvz]. Here, the plaintext choices for "B" are allowed to be the same as letters in the "Plaintext" column, because the connected-components of this character is "damaged", and may not have been matched properly by the Preprocessing algorith!!We can reduce this list of choices even further by performing a "Postprocessing" analysis. If, after Postprocessing, there is still not 1 unique, then put the remaining choices into either the "lower case possibilities" or "upper case possibilities" column of the Answer-Array.

"Postprocessing Analysis"

Touching Characters

When a plaintext letter is placed in the "Plaintext" column of the Answer-Array, it is immediately "linked" to its equivalent and unique-x-y histogram label. We can use this information to eliminate the unacceptable answers when analyzing touching characters. In the Touching-Array analysis, we assume that 1 single composite disguise, once separated, can represent a collection of "pairs of letters" (@=AB). Our goal in Postprocessing is to eliminate the unacceptable pairs from this collection, leaving the 1 correct par as the answer. It is possible that many of the plaintext identities of these "newly" separated letters (AB) may already be known, and sitting in the "Plaintext" column. All that is required to eliminate unacceptable pairs is to compare the known histogram label for the 1 single composite disguise @, with the "combined" known histogram labels for each letter appearing in both the "Plaintext" column, and in the "pair of letters" under consideration. Indeed, it may very well be possible to eliminate unacceptable pairs by comparing the known histogram label for the 1 composite disguise with only 1 of the 2 letters in any pair under consideration. We can continue to enhance our confidence in our ultimate choice even further by analyzing where it and all other alternatives occur in the prioritized list of the top 100 digraphs appearing later in this section. This frequency digraph is the one most likely to be the correct answer.

Broken Characters

In the Broken-Array analysis, we assume that 2 contiguous disguises, once recombined, can represent a collection of "single letter" choices (AB=@). It is important to note that these recombined single letters are allowed to be the same as letters in the "Plaintext" column of the Answer-Array. No single letter can be excluded just because it has already appeared in Plaintext" column! Out goal in Postprocessing is to eliminated the unacceptable single letters from this collection, leaving the 1 correct letter as the answer. All that is required to eliminate unacceptable single letters it to compare the "combined" known histogram labels for the 2 contiguous disguises (AB), with the "known" histogram label for each letter @ appearing in both the "Plaintext" column, and in collection of "single letter" choices under consideration. Indeed, it may very well be possible to eliminate unacceptable single letters by comparing the known histogram label for only 1 of the 2 contiguous disguises with the histogram for the single letter under consideration. Note, however, that if the single letter is not in the "Plaintext" column, then we do not known the histogram label for this single letter under consideration. Therefore, we cannot analyze this single letter by comparing histograms. The only remaining option available is to use traditional techniques.

Validating Plaintext Words

Throughout the document, each plaintext word (in font #j), which contains a Resegmented problem letter [m, w, d, or W], must be verified as a legitimate English word, by the pattern word software.

Example: For font #j, assume Resegmentation occurred for the problem letters =[md]. Therefore, all words in the document (in font #j), containing "m" and "d" must be verified. There are two ways to proceed: (1) Check each word separately in pattern word software (even each repeated words), or (2) Create a cache of already verified words containing "m" and "d", arranged according to wordlength. A new "m" or "d" word is compared to words in the cache. If a match is made, the new word is verified. If no match is made, put this new word through the pattern software for verification. If verified, put this word in cache as well. Otherwise, skip it! It is important to note that we must be careful when using the pattern word software for verification. If there exist words containing the "touching" letters "m", the Postprocessing software could incorrectly substitute the letter "m" in all words in the document containing this touching pair of letters. For example, suppose that the "touching" letters "m" occur in the word "charm", and the Postprocessing software incorrectly substitutes "m" to product the incorrect word "chum". Since both words are valid English words, we cannot use the pattern word software alone to verify which of the two is correct. Therefore, in all verifications, we must consider the following two scenarios:

1) If no verified answer emerges, once plaintext word is put through pattern software, then skip this word. It could be an acronym.
2) If 1 verified answer does emerge, once plaintext words is put through pattern software, then we must check to see if a 2nd verified answer exists as well.
   (a) If the letter "m" was Resegmented, and if the plaintext word contains an "m", then substitute an "m" to see if a 2nd answer emerges. If no 2nd answer emerges, then we have verified the original plaintext word containing "m". If a 2nd answer does emerge, then we have no way to choose which of the two plaintext words is correct: the one containing "m", or "m". Thus, we keep the plaintext word with the "m", and link to this word the 2nd choice containing the "m", so a database search will hit either word!This is similar to our approach to handling "a raster word that is difficult to recognize", where a Pattern Tag, which provides full-text searching of this difficult raster word, is linked to the Mixed-Plaintext word (which contains both raster and plaintext letters) generated from this difficult raster word, and preserves page typography.
   (b) If the letter "w" was Resegmented, and if the plaintext word contains an "w", then substitute a "vv" to see if a 2nd answer emerges. If no 2nd answer emerges, then we have verified the original plaintext word containing "w". If a 2nd answer does emerge, then we have no way to choose which of the two plaintext words is correct: the one containing "w", or "vv". Thus, we keep the plaintext word with the "w", and link to this word the 2nd choice containing the "vv", so a database search will hit either word!
   (c) If the letter "d" was Resegmented, and if the plaintext word contains a "d", then substitute a "cl" to see if a 2nd answer emerges. If no 2nd answer emerges, then we have verified the original plaintext word containing "d". If a 2nd answer does emerge, then we have no way to choose which of the two plaintext words is correct: the one containing "d", or "cl". Thus, we keep the plaintext word with the "d", and ink to this word the 2nd choice containing the "cl", so a database search will hit either word!
   (d) If the letter "W" was Resegmented, and if the plaintext word contains an "W", then substitute a "VV" to see if a 2nd answer emerges. If no 2nd answer emerges, then we have verified the original plaintext word containing "W". If a 2nd answer does emerge, then we have now way to choose which of the two plaintext words is correct: the one containing "W", or "V V". Thus, we keep the plaintext word with the "W", and link to this word the 2nd choice containing the "VV", so a database search will hit either word!

Automatic Indexing & The Most Common Words in English

The Metafile should be able to discriminate between the relative importance of words on each page of a document. An efficient database search engine will not allow users to search for common words. These words, when entered on the command line, will be ignored. Using this insight, the Metafile can be designed with an extremely efficient data structure for indexing words on each page of a document, with common words given the lowest priority. This will increase tremendously the speed with which database searches can be accomplished. The 100 most common words in English are listed below. The figures give occurrences in 242,432 words.

| 1. | THE | 15,568 |
|---|---|---|
| 2. | OF | 9,767 |
| 3. | AND | 7,638 |
| 4. | TO | 5,739 |
| 5. | A | 5,074 |
| 6. | IN | 4,312 |
| 7. | THAT | 3,017 |
| 8. | IS | 2,509 |
| 9. | I | 2,292 |
| 10. | IT | 2,255 |
| 11. | FOR | 1,869 |
| 12. | AS | 1,853 |
| 13. | WITH | 1,849 |
| 14. | WAS | 1,761 |
| 15. | HIS | 1,732 |
| 16. | HE | 1,727 |
| 17. | BE | 1,535 |
| 18. | NOT | 1,496 |
| 19. | BY | 1,392 |
| 1. | THE | 15,568 |
| 20. | BUT | 1,379 |
| 21. | HAVE | 1,344 |
| 22. | YOU | 1,336 |
| 23. | WHICH | 1,291 |
| 24. | ARE | 1,222 |
| 25. | ON | 1,155 |
| 26. | OR | 1,101 |
| 27. | HER | 1,093 |
| 28. | HAD | 1,062 |
| 29. | AT | 1,053 |
| 30. | FROM | 1,039 |
| 31. | THIS | 1,021 |
| 32. | MY | 963 |
| 33. | THEY | 959 |
| 34. | ALL | 881 |
| 35. | THEIR | 824 |
| 36. | AN | 789 |
| 37. | SHE | 775 |
| 38. | HAS | 753 |
| 39. | WERE | 752 |
| 40. | ME | 745 |
| 41. | BEEN | 720 |
| 42. | HIM | 708 |
| 43. | ONE | 700 |
| 44. | SO | 696 |
| 26. | OR | 1,101 |
| 45. | IF | 684 |
| 46. | WILL | 680 |
| 47. | THERE | 668 |
| 48. | WHO | 664 |
| 49. | NO | 658 |
| 50. | WE | 638 |
| 51. | WHEN | 603 |
| 52. | WHAT | 570 |
| 53. | YOUR | 533 |
| 54. | MORE | 523 |
| 55. | WOULD | 516 |
| 56. | THEM | 498 |
| 57. | SOME | 478 |
| 58. | THAN | 445 |
| 59. | MAY | 441 |
| 60. | UPON | 430 |
| 61. | ITS | 425 |
| 62. | OUT | 387 |
| 63. | INTO | 387 |
| 64. | OUR | 386 |
| 65. | THESE | 385 |
| 66. | MAN | 383 |
| 67. | UP | 369 |
| 68. | DO | 360 |
| 69. | LIKE | 354 |
| 51. | WHEN | 603 |
| 70. | SHALL | 351 |
| 71. | GREAT | 340 |
| 72. | NOW | 331 |
| 73. | SUCH | 328 |
| 74. | SHOULD | 327 |
| 75. | OTHER | 320 |
| 76. | ONLY | 309 |
| 77. | ANY | 302 |
| 78. | THEN | 298 |
| 79. | ABOUT | 294 |
| 80. | THOSE | 288 |
| 81. | CAN | 285 |
| 82. | MADE | 284 |
| 83. | WELL | 283 |
| 84. | OLD | 282 |
| 85. | MUST | 280 |
| 86. | US | 279 |
| 87. | SAID | 276 |
| 88. | TIME | 273 |
| 89. | EVEN | 272 |
| 90. | NEW | 265 |
| 91. | COULD | 264 |
| 92. | VERY | 259 |
| 93. | MUCH | 252 |
| 94. | OWN | 251 |
| 76. | ONLY | 309 |
| 95. | MOST | 251 |
| 96. | MIGHT | 250 |
| 97. | FIRST | 249 |
| 98. | AFTER | 247 |
| 99. | YET | 247 |
| 100. | TWO | 244 |

Suggestions on Metafile Format

At the very beginning of Metafile, store exactly 1 and only 1 copy of each word occurring throughout the document. Words should be separated into 4 groups: (1) Non-Common Pattern Words (2) Non-Common Non-Pattern Words (3) Common Pattern Words (4) Common Non-Pattern Words. The words in each group are ordered alphabetically, and according to word-length. Each word has pointers to every x-y location, and line, on each page where it occurs within the document. Each word may also be expressed in many different fonts depending on its x-y location. The main benefit to this ordering is that the database engine is only required to uncompress and search the very beginning of the Metafile, and not the entire document, to known everything contained in that document. FIG. 35 shows an example of an array grouping of common word (non-pattern and pattern).

Procedure to Accelerate the Substitution of Plaintext Characters Throughout the Document After the Recognition Process has been Completed Substituting single-letter plaintext characters is straightforward. The acceleration in the time required to process a document, however, occurs when substituting for plaintext touching characters (composite blobs). If the composite blobs, assumed here to be digraphs (representing 2 touching characters), within the cache are prioritized based on the frequency that they occur in the English language, then blobs located at the beginning of the cache will appear in far more words throughout the document than blobs located at the end of the cache. Some of the digraphs below may not represent touching characters (composite blobs) in the specific font, within the document, presently under consideration. If this is indeed the case, simply ignore irrelevant digraphs below, and prioritize only the touching blobs, based on where they do occur in the list below.

| | | |
|---|---|---|
| 1. | TH | 1,582 |
| 2. | IN | 784 |
| 3. | ER | 667 |
| 4. | RE | 625 |
| 5. | AN | 542 |
| 6. | HE | 542 |
| 7. | AR | 511 |
| 8. | EN | 511 |
| 9. | TI | 510 |
| 10. | TE | 492 |
| 11. | AT | 440 |
| 12. | ON | 420 |
| 13. | HA | 420 |
| 14. | OU | 361 |
| 15. | IT | 356 |
| 16. | ES | 343 |
| 17. | ST | 340 |
| 18. | OR | 339 |
| 19. | NT | 337 |
| 20. | HI | 330 |
| 21. | EA | 321 |
| 22. | VE | 321 |
| 23. | CO | 296 |
| 24. | DE | 275 |
| 25. | RA | 275 |
| 26. | RO | 275 |
| 27. | LI | 273 |
| 28. | RI | 271 |
| 29. | IO | 270 |
| 30. | LE | 263 |
| 31. | ND | 263 |
| 32. | MA | 260 |
| 33. | SE | 259 |
| 34. | AL | 246 |
| 35. | IC | 244 |
| 36. | FO | 239 |
| 37. | IL | 232 |
| 38. | NE | 232 |
| 39. | LA | 229 |
| 40. | TA | 225 |
| 41. | EL | 216 |
| 42. | ME | 216 |
| 43. | EC | 214 |
| 44. | IS | 211 |
| 45. | DI | 210 |
| 46. | SI | 210 |
| 47. | CA | 202 |
| 48. | UN | 201 |
| 49. | UT | 189 |
| 50. | NC | 188 |
| 51. | WI | 188 |
| 52. | HO | 184 |
| 53. | TR | 183 |
| 54. | BE | 181 |
| 55. | CE | 177 |
| 56. | WH | 177 |
| 57. | LL | 176 |
| 58. | FI | 175 |
| 59. | NO | 175 |
| 60. | TO | 175 |
| 61. | PE | 174 |
| 62. | AS | 172 |
| 63. | WA | 171 |
| 64. | UR | 169 |
| 65. | LO | 166 |
| 66. | PA | 165 |
| 67. | US | 165 |
| 68. | MO | 164 |
| 69. | OM | 163 |
| 70. | AI | 162 |
| 71. | PR | 161 |
| 72. | WE | 158 |

-continued

| | | |
|---|---|---|
| 73. | AC | 152 |
| 74. | EE | 148 |
| 75. | ET | 146 |
| 76. | SA | 146 |
| 77. | NI | 142 |
| 78. | RT | 142 |
| 79. | NA | 141 |
| 80. | OL | 141 |
| 81. | EV | 131 |
| 82. | IE | 129 |
| 83. | MI | 128 |
| 84. | NG | 128 |
| 85. | PL | 128 |
| 86. | IV | 127 |
| 87. | PO | 125 |
| 88. | CH | 122 |
| 89. | EI | 122 |
| 90. | AD | 120 |
| 91. | SS | 120 |
| 92. | IL | 118 |
| 93. | OS | 117 |
| 94. | UL | 115 |
| 95. | EM | 114 |
| 96. | NS | 113 |
| 97. | OT | 113 |
| 98. | GE | 112 |
| 99. | IR | 112 |
| 100. | AV | 111 |

LA-Array Analysis

1.) Delete all plaintext words.
2.) There must exist at least 2 words containing any specific disguise for it to be considered for analysis.
   If there exist only 1 word, use pattern word software to limit choices for disguised letters. If in addition this word <2-letters, create a Self_Id-Array to check for additional plaintext possibilities. Put results in Array for verification.
   If there exist only 1 word, and if it is a 2-letter word, then the disguise could represent a lower case plaintext letter (not in Answer-Array)
or upper case plaintext letter (not in Answer-Array). Put results in Answer-Array for verification.
7.) Words not assumed to begin with Capital-letters are probably acronyms. Put in Answer-Array.
8.) If there exist any unidentified disguises, check to see whether any of these disguises also appear in 1NP-Array. If so, that assume disguise is "i" or "a". If a unique plaintext answer emerges, put it in Answer-Array. If not, put disguise in Answer-Array: Ex. Q and Qt. Q=i and Q=a are both possibilities, but no unique answer emerges.
9.) When a plaintext identity is uncovered, it is substituted simultaneously into ALL Arrays: nP-, nNP-, Answer-, etc.
   Use Bounding Boxes information on each character of each word in LA-Array to eliminate possible plaintext choices, BEFORE any other analysis is performed!
   If, at the conclusion of LA-Array analysis, we must leave a word or character as a raster image, then we should also attach both the Isomorph Pattern" and the
   At this point, all Font Conflicts must be resolved!
   Access Digit-Array now. Use it limited the number of comparisons required, with synthesized alphabet, to uncover the identities of digits.
   Before synthesizing any fonts, either for verification using traditional techniques or for document formatting, check to see if any "known" plaintext letters (in the "Plaintext" column) also appear in any "lower case" or "upper case" columns anywhere in the Answer-Array (not necessarily on the "same" Row as that of "plaintext letter in the "Plaintext" column, presently under consideration"). If so, "delete" all copies of this letter appearing in "lower case" or "upper case" columns. If in any Row where deletion occurs, there now exists only 1 surviving plaintext choice in the "combined" lower case and upper case columns, then this 1 letter is put into "Plaintext" slot, since it has now been "verified". If (total number of disguises (excluding punctuation and symbols))—(total number of disguises in Collection II and with Bounding Boxes=5)>26, then this implies that digits (and perhaps symbols) are contacting letters!

Ex: "Bounding Boxes Pattern" (for all lower case letters) information for the phrase "the good guys"=113 2331 2323", allows us the eliminate possibly unacceptable plaintext characters.

Ex: "the"=113: plaintext possibilities=[the tho] Note: May have to use traditional technique to choose between "e" and "o".

Ex: "good"=2331: plaintext possibilities=[good goof gook jaal peed peek peel pooh pook pool psst]

Ex: "guys"=2323; plaintext possibilities [gape guys gips goya guys jags jape jays jpe pega pego pegs pegu page pigs pago puyo pugo]

We proceed as follows to try and isolate a "unique" answer: a.) Create a "Bounding Boxes Pattern" for this Selected Word (This type of pattern is discussed in more detail in the LA-Array section). Combine this Bounding Boxes Pattern information with the "surviving" Selected Word possibilities (in those Rows containing no "0" entries). If a "unique" answer results, then we are finished analyzing this specific Selected Word. If no "unique" answer emerges, then b.) Check to see if any of the "disguises" in this Selected Word have pre-existing entries in the "lower case possibilities" and "upper case possibilities" columns the in Answer-Array (This information would have been put in those columns when the disguise in question were encountered in an earlier paragraph of text). This "lower case" and "upper case" information, when combined with the information in part a, above, will hopefully either isolate a "unique" answer, or "further" reduce the acceptable plaintext choices for these disguises in question (by eliminating some of the choices in the pre-existing "lower case" and "upper case" possibilities columns).

If ALL possible plaintext answers for Selected Word are eliminated, the something went wrong. Since we don't known which word cased the problem, they all get put into LA-Array.

What is claimed is:

1. A system for character recognition, comprising:

a resource that receives a plurality of representations of a plurality of characters;

a resource that assigns a plurality of cipher labels to representations in the plurality of representations;

memory storing a dictionary of plaintext words indexed by isomorphs; and a resource that identifies a plaintext identity of cipher words including groups of cipher labels in the plurality of cipher labels using isomorphic pattern recognition including a resource that identifies an isomorph associated with a selected cipher word, and accesses one or more candidate plaintext words from said dictionary of plaintext words in response to the isomorph of the selected cipher word.

2. The system of claim 1, wherein:

the resource that assigns the plurality of cipher labels to representations in the plurality of representations assigns a different cipher label to each different representation in the plurality of representations.

3. The system of claim 1, wherein:

the resource that identifies the plaintext identity of cipher labels in the plurality of cipher labels includes a resource that creates sets of cipher labels selected from the plurality of cipher labels.

4. The system of claim 3, wherein:

the resource that identifies the plaintext identify of cipher labels in the plurality of cipher labels includes a resource that creates a Document Word List which contains cipher words in the plurality of cipher words.

5. The system of claim 4, wherein:

the resource that identifies the plaintext identity of cipher words includes a resource that selects a Trail Word from the Document Word Lists, the Trail Word containing at least one cipher label in common with the Selected Word.

6. The system of claim 4, wherein:

the resource that identifies the plaintext identify of cipher labels in the plurality of cipher labels includes a resource that eliminates candidate plaintext words that cannot also form a valid plaintext Trail Word.

7. The system of claim 4, wherein:

the resource that identifies the plaintext identity of cipher labels in the plurality of cipher labels includes a resource that eliminates candidate plaintext words using a Raster-Plaintext Library wherein the Raster-Plaintext Library contains a plurality of raster letters and a plurality of plaintext identities for raster letters in the plurality of raster letters.

8. The system of claim 4, wherein:

the resource that identifies the plaintext identity of cipher labels in the plurality of cipher labels includes a resource that substitutes a plaintext identity for identified cipher labels in cipher words in the plurality of cipher words in the Document Word List.

9. The system of claim 1, wherein:

the resource that identifies the plaintext identity of cipher labels in the plurality of cipher labels includes a resource that attempts to identity cipher labels in the plurality of cipher labels until all cipher labels have been identified.

10. The system of claim 1, wherein:

the resource that identifies the plaintext identity of cipher labels in the plurality of cipher labels includes a resource that assigns a Pattern Tag to a word in a Document Word List which contains unrecognized cipher labels, wherein the Pattern Tag represents a plaintext word which has a same cipher pattern as the word in the Document Word List being assigned the Pattern Tag.

11. The system of claim 1, wherein:

the resource that receives the plurality of representations receives representations in the plurality of representations from a touch sensitive input device.

12. The system of claim 11, wherein:

the touch sensitive input device is capable of being hand held.

13. A process for pattern recognition, comprising:

receiving a plurality of representations representing a document, the representations containing a plurality of characters;

assigning cipher labels to characters in the plurality of characters in representations in the plurality of representations; and identifying a plaintext identity of cipher labels in the plurality of cipher labels using isomorphic pattern recognition; wherein the step of identifying includes assigning an isomorph to a selected representation in the plurality of representations, and accessing a dictionary indexed by isomorphs of plaintext words to select a set of candidate words which match the assigned isomorph.

14. The process of claim 13, wherein:

assigning cipher labels includes assigning a different cipher label to each different representation in the plurality of representations.

15. The process of claim 14, wherein:

assigning cipher labels to characters in the plurality of characters in representations in the plurality of representations includes producing a plurality cipher words.

16. The process of claim 15, wherein:

identifying the plaintext identify of cipher labels in the plurality of cipher labels includes creating a Document Word List which contains cipher words in the plurality of cipher words.

17. The process of claim 16, wherein:

identifying the plaintext identity of cipher labels in the plurality of cipher labels includes selecting a Selected Word from the Document Word List, the Selected Word containing at least one cipher label to be identified.

18. The process of claim 17, wherein:

identifying the plaintext identify of cipher labels in the plurality of cipher labels includes selecting a Trail Word from the Document Word List, the Trial Word containing at least one cipher label in common with the Selected Word.

19. The process of claim 17, wherein:

identifying the plaintext identity of cipher labels in the plurality of cipher labels includes eliminating candidate plaintext words that cannot also form a valid plaintext Trail Word.

20. The process of claim 17, wherein:

identifying the plaintext identity of cipher labels in the plurality of cipher labels includes eliminating candidate plaintext words using a Raster-Plaintext Library wherein the Raster-Plaintext Library contains a plurality of raster letters and a plurality of plaintext identities for raster letters in the plurality of raster letters.

21. The process of claim 16, wherein:

identifying the plaintext identity of cipher labels in the plurality of cipher labels includes substituting a plaintext identity for the identified cipher labels in cipher words in the plurality of cipher words in the Document Word List.

22. The process of claim 13, wherein:

identifying the plaintext identity of cipher labels in the plurality of cipher labels includes attempting to identify cipher labels in the plurality of cipher labels until all cipher labels have been identified.

23. The process of claim 16, wherein:

identifying the plaintext identity of cipher labels in the plurality of cipher labels includes assigning a Pattern Tab to a cipher word in the Document Word List which contains unrecognized cipher labels, wherein the Pattern Tag represents a plaintext word which has a same cipher pattern as the word in the Document Word List being assigned the Pattern Tag.

24. The process of claim 13, wherein:

receiving the plurality of representations includes receiving representations in the plurality of representations from a touch sensitive input device.

25. The system of claim 24, wherein:

the touch sensitive input device is capable of being hand held.

26. A character recognition system, comprising:

an imaging device which generates a representation of a document, the representation including a plurality of images of characters in the document;

a processor coupled to the imaging device capable of receiving the representation of the document, the processor assigning a plurality of cipher labels to images in the plurality of images; and the processor using pattern recognition to assign plaintext characters to cipher labels in the plurality of cipher labels, and including memory storing a dictionary of plaintext words indexed by isomorphs; and a recourse to identify cipher words including groups of cipher labels in the plurality of cipher labels using isomorphic pattern recognition, and a resource that identifies an isomorph associated with a selected cipher word, and accesses on or more candidate plaintext words from said dictionary of plaintext words in response to the isomorph of the selected cipher word.

27. The system of claim 26, wherein:

the processor includes a resource that constructs a Document Word List which contains cipher words in the plurality of cipher words.

28. The system of claim 27, wherein:

the processor includes a resource that selects a Selected Word from the Document Word List, wherein the Selected Word contains a cipher label to be identified.

29. The system of claim 28, wherein:

the processor includes a resource which selects a list o candidate plaintext words in a plurality of plaintext words which have a same isomorphic pattern as the Selected Word.

30. The system of claim 29, wherein:

the processor includes a resource the select a Trail Word from the Document Word List wherein the Trial Word contains at least one cipher label in common with the Selected Word.

31. The system of claim 30, wherein:

the processor includes a resource which eliminates candidate plaintext words from the list of candidate plaintext words which cannot form a plaintext word which is isomorphic with the Trail Word.

32. The system of claim 27, wherein:

the processor includes a resource that selects a plurality of Trail Words from the Document Word List wherein Trail Words in the plurality of Trail Words contain at least one cipher label in common with the Selected Word.

33. The system of claim 32, wherein:

the processor includes a resource which eliminates candidate plaintext words in the plurality of candidate plaintext words from the plurality of lists of candidate plaintext words which cannot form a plaintext word in the plurality of plaintext words in the plurality of lists of candidate plaintext words.

34. The system of claim 33, wherein:

the processor includes a resource which substitutes a single remaining candidate plaintext word, from the list of candidate plaintext words, for the Selected Word in the Document Word List when only one candidate plaintext word remains in the list of candidate plaintext words.

35. The system of claim 34, wherein:

the processor includes a resource which substitutes the plaintext identity or identified cipher labels in cipher words in the Document Word List.

36. The system of claim 35, wherein:

the processor includes a resource that continues to select Trail Words from the Document Word List until all cipher labels that can be identified are identified.

37. The system of claim 36, wherein:

the processor includes a resource which assigns a Pattern Tag to a cipher word in the Document Word List which contains unidentified cipher labels.

38. The system of claim 37, wherein:

the Pattern Tag represents a plaintext word which has a same cipher pattern as the word in the Document Word List being assigned the Pattern Tag.

39. The system of claim 29, wherein:

the resource that identifies the plaintext identity of cipher labels in the plurality of cipher labels includes a resource that eliminates candidate plaintext words using a Raster-Plaintext Library wherein the Raster-Plaintext Library contains a plurality of raster letters and a plurality of plaintext identities for raster letters in the plurality of raster letters.

40. The process of claim 26, wherein:

the imaging device includes a touch sensitive device.

41. The system of claim 40, wherein:

the touch sensitive input device is capable of being hand held.

* * * * *